(12) United States Patent
Cherian et al.

(10) Patent No.: US 10,299,092 B2
(45) Date of Patent: May 21, 2019

(54) SYSTEMS AND METHODS FOR MACHINE TO MACHINE DEVICE CONTROL AND TRIGGERING

(71) Applicant: QUALCOMM Incorporated, San Diego, CA (US)

(72) Inventors: George Cherian, San Diego, CA (US); Jun Wang, Poway, CA (US); Anand Palanigounder, San Diego, CA (US); John Wallace Nasielski, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/337,071

(22) Filed: Oct. 28, 2016

(65) Prior Publication Data

US 2017/0111755 A1    Apr. 20, 2017

Related U.S. Application Data

(62) Division of application No. 13/691,347, filed on Nov. 30, 2012, now Pat. No. 9,497,102.

(Continued)

(51) Int. Cl.
    *H04W 76/00*      (2018.01)
    *H04W 4/00*      (2018.01)
    (Continued)

(52) U.S. Cl.
    CPC ............... *H04W 4/70* (2018.02); *H04L 45/00* (2013.01); *H04W 76/11* (2018.02)

(58) Field of Classification Search
    CPC ........ H04L 45/00; H04W 4/70; H04W 76/00; H04W 76/11
    See application file for complete search history.

(56) References Cited

U.S. PATENT DOCUMENTS

| | | | |
|---|---|---|---|
| 7,468,968 B2 * | 12/2008 | Svensson | H04W 76/12 370/338 |
| 8,818,426 B2 * | 8/2014 | Jain | H04W 4/70 455/458 |

(Continued)

FOREIGN PATENT DOCUMENTS

| | | |
|---|---|---|
| CN | 1706166 A | 12/2005 |
| CN | 101321099 A | 12/2008 |

(Continued)

OTHER PUBLICATIONS

3rd Generation Partnership Project, Technical Specification Group Services and System Aspects, Service requirements for machine-type communications(MTC), Stage 1 (Release 11), 3GPP Standard, 3GPP TS 22.368, 3rd Generation Partnership Project (3GPP), Mobile Competence Centre, 650, Route Des Lucioles, F-06921 Sophia-Antipolis Cedex, France, vol. SA WG1, No. V11.2.0, Jun. 21, 2011, pp. 1-25, XP050553322.

(Continued)

*Primary Examiner* — Ahmed Elallam
(74) *Attorney, Agent, or Firm* — Arent Fox, LLP

(57) ABSTRACT

Systems and methods for control and triggering of machine to machine (M2M) devices (e.g., smart meters). More specifically how to allow an M2M service provider (e.g., utility company) to use an operator's network to communicate with the M2M device connected with a UE/GW associated with the operator's network. The M2M service provider may receive identification of the UE/GW, but not for the M2M device. By transmitting an identifier for the M2M device along with an identifier for the UE/GW, the network operator may define establish and maintain a communication path specific to M2M devices. Similar techniques may be incorporated to allow the M2M service provider to locate and trigger the M2M device.

12 Claims, 9 Drawing Sheets

Related U.S. Application Data

(60) Provisional application No. 61/567,537, filed on Dec. 6, 2011, provisional application No. 61/596,150, filed on Feb. 7, 2012.

(51) Int. Cl.
*H04W 4/70* (2018.01)
*H04L 12/701* (2013.01)
*H04W 76/11* (2018.01)

(56) References Cited

U.S. PATENT DOCUMENTS

| | | | |
|---|---|---|---|
| 8,897,227 B2* | 11/2014 | Li | H04L 43/0811 370/328 |
| 9,049,666 B2* | 6/2015 | Charbit | H04W 52/143 |
| 9,088,967 B2 | 7/2015 | Lim et al. | |
| 9,241,351 B2* | 1/2016 | Jain | H04W 76/10 |
| 9,271,222 B2* | 2/2016 | Xie | H04W 48/08 |
| 9,344,835 B2* | 5/2016 | Chou | H04W 4/70 |
| 9,439,047 B2* | 9/2016 | Li | H04W 4/70 |
| 9,736,873 B2* | 8/2017 | Russell, Jr. | H04W 8/20 |
| 10,104,180 B2* | 10/2018 | Seed | H04L 41/0213 |
| 2004/0071122 A1 | 4/2004 | Svensson et al. | |
| 2011/0085470 A1 | 4/2011 | Park et al. | |
| 2011/0140846 A1 | 6/2011 | Blanz et al. | |
| 2011/0249636 A1 | 10/2011 | Cherian et al. | |
| 2011/0264740 A1* | 10/2011 | Diachina | H04W 4/005 709/204 |
| 2011/0306386 A1 | 12/2011 | Centoza et al. | |
| 2012/0117140 A1 | 5/2012 | Wang et al. | |
| 2012/0124201 A1 | 5/2012 | Muhanna et al. | |
| 2012/0142268 A1 | 6/2012 | Tao et al. | |
| 2012/0220326 A1 | 8/2012 | Li et al. | |
| 2012/0281619 A1 | 11/2012 | Tao et al. | |
| 2012/0284777 A1 | 11/2012 | Eugenio et al. | |
| 2013/0012191 A1* | 1/2013 | Charbit | H04W 52/143 455/422.1 |
| 2013/0016657 A1 | 1/2013 | Muhanna et al. | |
| 2013/0084894 A1* | 4/2013 | Jain | H04W 4/70 455/458 |
| 2013/0094444 A1* | 4/2013 | Lai | H04W 4/70 370/328 |
| 2013/0142118 A1 | 6/2013 | Cherian et al. | |
| 2013/0155948 A1 | 6/2013 | Pinheiro et al. | |
| 2013/0188515 A1 | 7/2013 | Pinheiro et al. | |
| 2013/0201830 A1* | 8/2013 | Wang | H04W 4/70 370/235 |
| 2015/0249901 A1* | 9/2015 | Muhanna | H04W 4/005 455/426.1 |

FOREIGN PATENT DOCUMENTS

| | | |
|---|---|---|
| CN | 102238530 A | 11/2011 |
| JP | 2007318289 A | 12/2007 |
| KR | 20040081666 A | 9/2004 |
| KR | 20110040677 A | 4/2011 |
| WO | WO-2011098150 A1 | 8/2011 |
| WO | WO-2011116849 A1 | 9/2011 |
| WO | WO-2011127810 A1 | 10/2011 |
| WO | WO-2011129098 A1 | 10/2011 |
| WO | WO-2011135790 A1 | 11/2011 |
| WO | WO-2011137695 A1 | 11/2011 |
| WO | WO-2011139952 A1 | 11/2011 |

OTHER PUBLICATIONS

ACISI0N: "MTC triggering w/o E164 MSISDN using MT SMS addressing formats", 3GPP Draft; S2-112763, 3rd Generation Partnership Project (3GPP), Mobile Competence Centre ; 650, Route Des Lucioles ; F-06921 Sophia-Antipolis Cedex ; France, vol. SA WG2, No. Xi'An; 20110516, May 23, 2011 (May 23, 2011), XP050525768, pp. 5, [retrieved on May 23, 2011] the whole document.

Ahmad Muhannaepsilonricsson Com 972-583-2769: "Details of the M2M identifiers Info Model", 3GPP2 Draft; M2M-20110125-006_ERICSSON-M2M-Identifiersinfo-Moidel-SC.P4005, 3rd Generation Partnership Project 2, 3GPP2, 2500 Wilson Boulevard, Suite 300, Arlington, Virginia 22201; USA, vol. TSGS Jan. 26, 2011, pp. 1-31, XP062096608.

Ahmad Muhannaepsilonricsson Com 972-583-2769: "M2M Identifiers Info Model", 3GPP2 Draft; 2M-20110125-005_ERICSSONM2M-Identifiers-Info-Model, 3rd Generation Partnership Project 2, 3GPP2, 2500 Wilson Boulevard, Suite 300, Arlington, Virginia 22201; USA, vol. TSGS Jan. 26, 2011, pp. 1-21, XP062096614.

International Search Report and Written Opinion—PCT/US2012/068289—ISA/EPO—Apr. 17, 2013.

Panasonic et al: "Additional security for MTC Triggering requirements", 3GPP Draft; S1-110052-SIMTC-Security, 3rd Generation Partnership Project (3GPP), Mobile Competence Centre ; 650, Route Des Lucioles ; F-06921 Sophia-Antipolis Cedex ; France, ; vol. SA WG1, No. Nashville, Tennessee, USA; 20110214; Feb. 7, 2011 (Feb. 7, 2011), XP050514446.

* cited by examiner

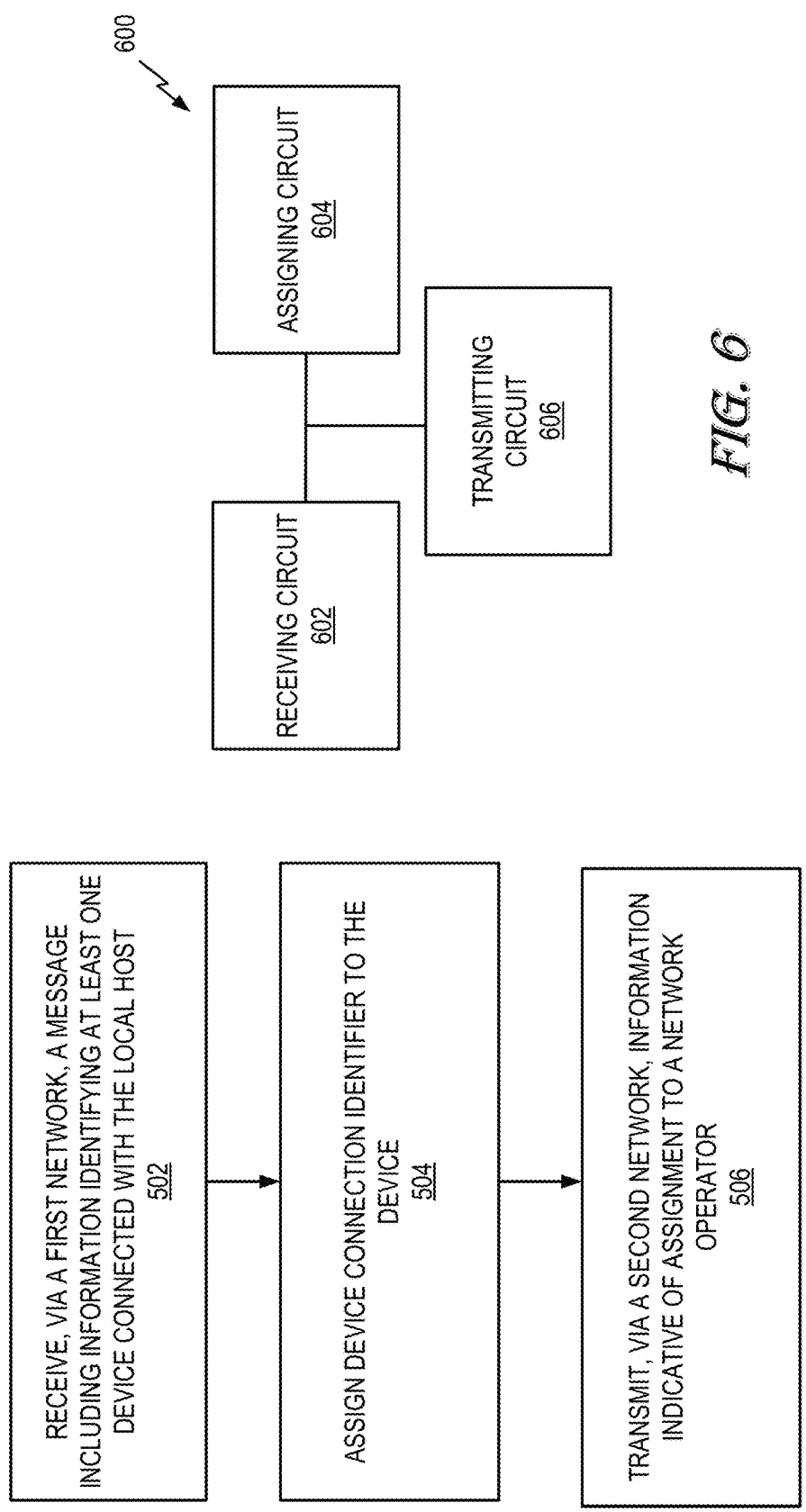

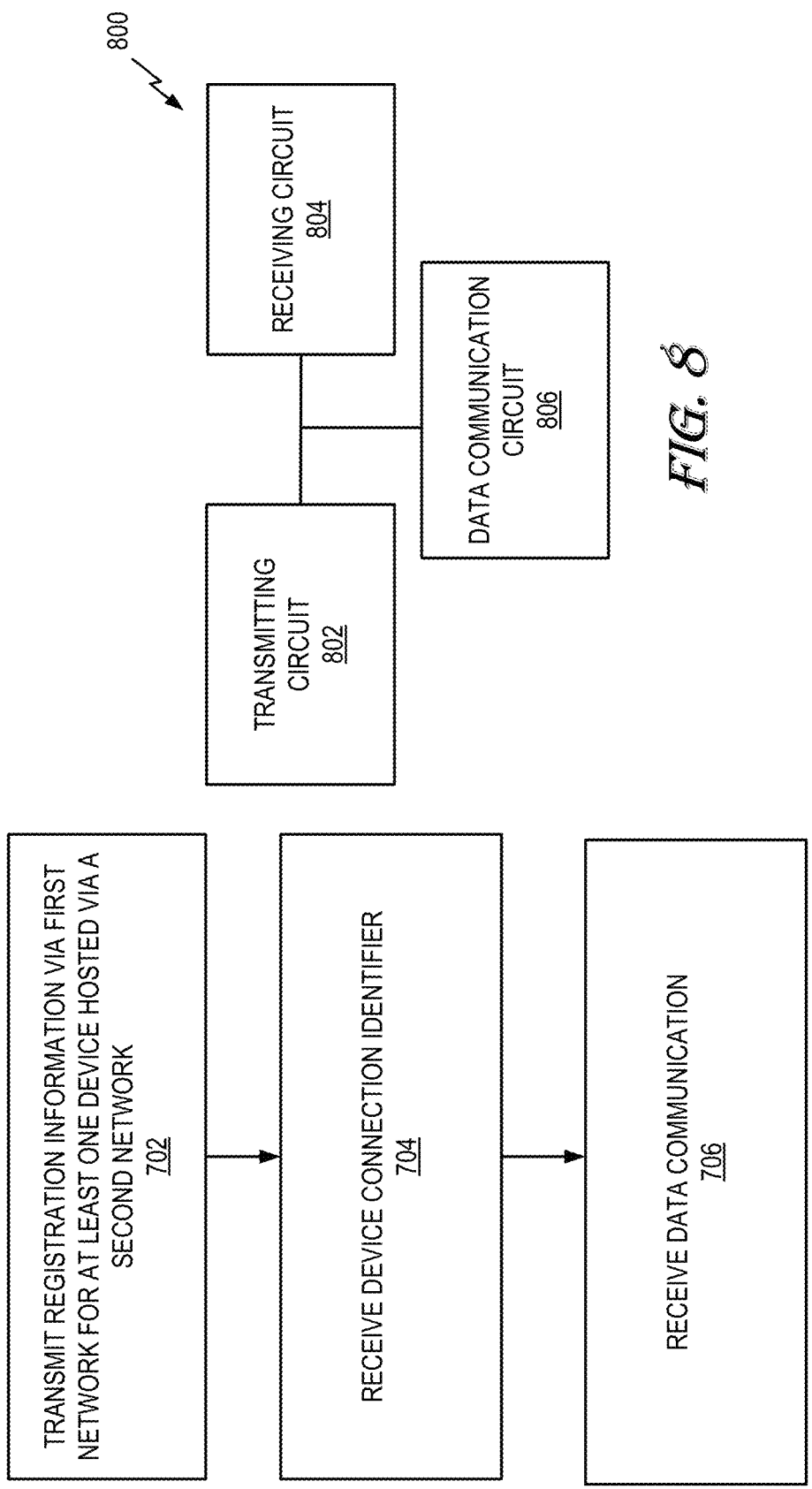

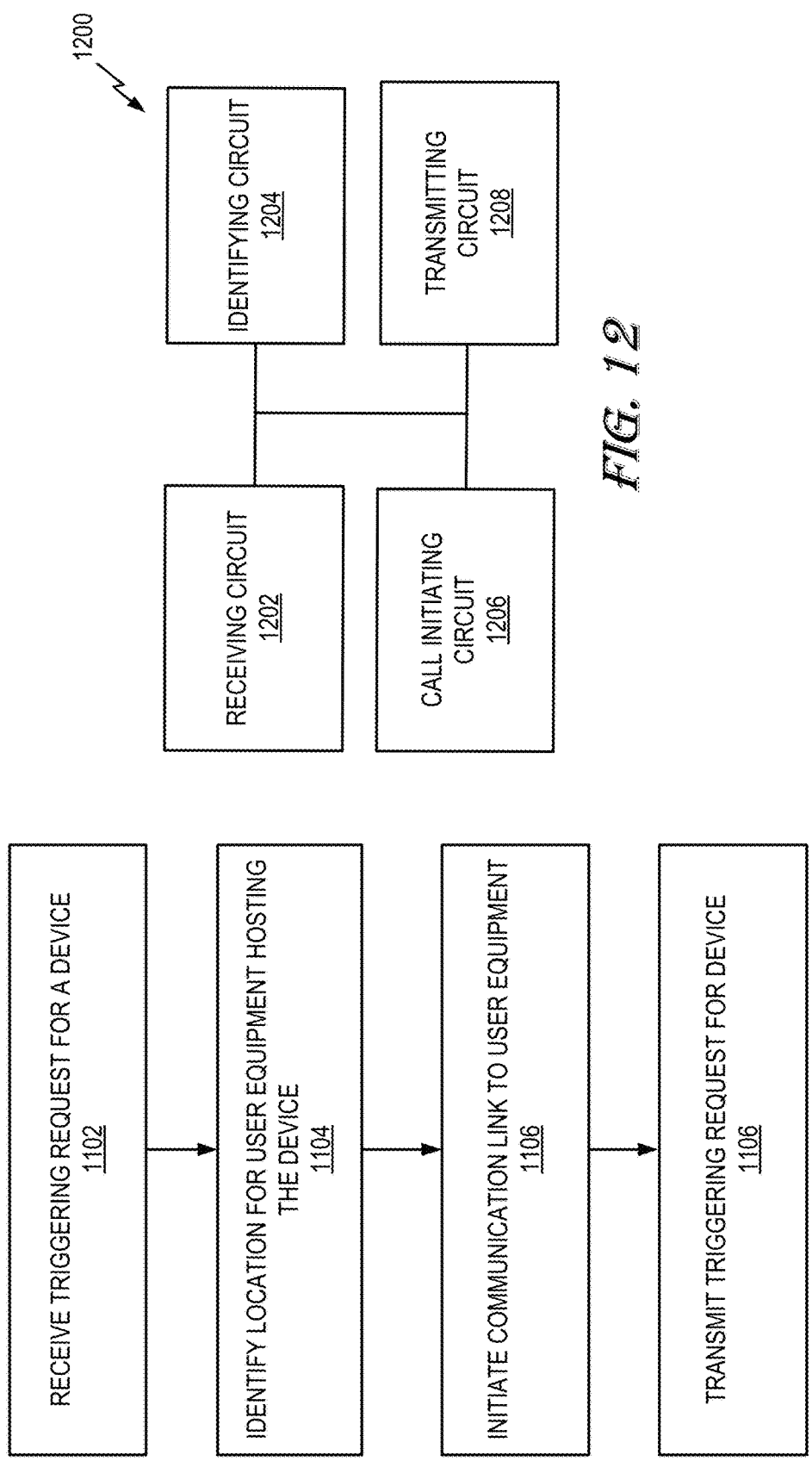

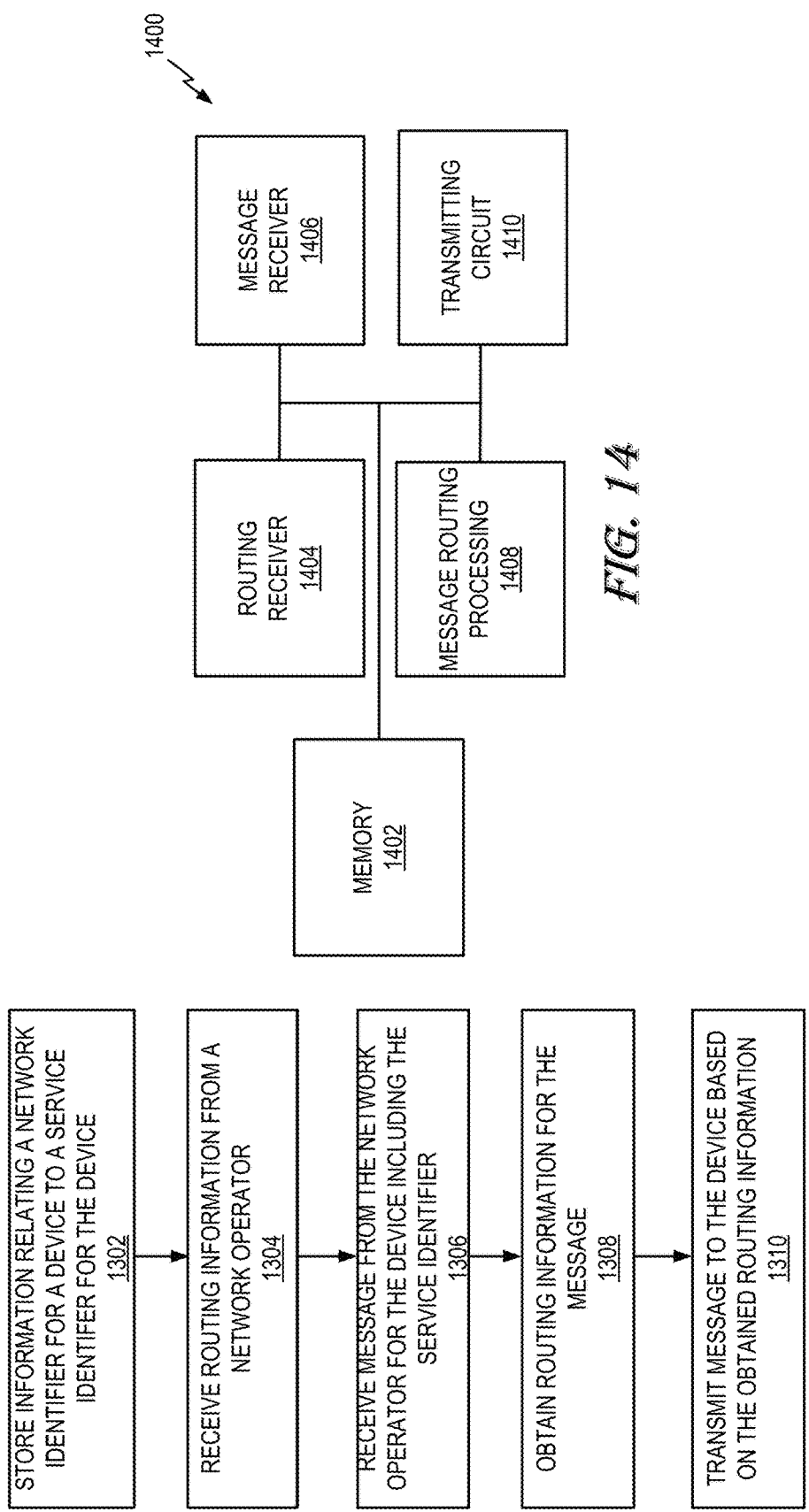

SYSTEMS AND METHODS FOR MACHINE TO MACHINE DEVICE CONTROL AND TRIGGERING

CROSS-REFERENCE TO RELATED APPLICATIONS

This application is a Division of U.S. Non-Provisional application Ser. No. 13/691,347, entitled "SYSTEMS AND METHODS FOR MACHINE TO MACHINE DEVICE CONTROL AND TRIGGERING," filed on Nov. 30, 2012, which claims the benefit of U.S. Provisional Application Ser. No. 61/567,537, entitled "SYSTEMS AND METHODS FOR MACHINE TO MACHINE DEVICE CONTROL AND TRIGGERING" and filed on Dec. 6, 2011, and U.S. Provisional Application Ser. No. 61/596,150, entitled "SYSTEMS AND METHODS FOR MACHINE TO MACHINE DEVICE CONTROL AND TRIGGERING" and filed on Feb. 7, 2012, which are expressly incorporated by reference herein in their entirety.

BACKGROUND

Field

The present application relates generally to communication systems and more specifically to control and triggering methods and devices for machine to machine communications.

Background

In many communication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), or personal area network (PAN). Networks also differ according to the switching/routing technique used to interconnect the various network nodes and devices (e.g., circuit switching versus packet switching), the type of physical media employed for transmission (e.g., wired versus wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

As networks proliferate, the types of network elements connected thereto also expand. One type of network elements being introduced are machine to machine (M2M) elements. Examples of M2M elements include a smart utility meter ("smartmeter"), seismographs, vehicles, and appliances. An M2M element may connect to a network through a user equipment (e.g., smartphone, WiFi router). Accordingly, improvements to communication systems may be desirable to improve communication via the network, such as communication from an M2M service provider (e.g., utility company), with a connected M2M element.

SUMMARY

The methods and devices described each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features described provide advantages that include identification of and communication with M2M devices attached to a user equipment.

In one innovative aspect, a method of binding a plurality of devices to a user equipment is provided. The method includes receiving, via a first network, a message from at least one of the plurality of devices, the message including information identifying a device of the plurality of devices connected with the user equipment. The method includes assigning a device connection identifier to the device, the device connection identifier including at least a portion of a user equipment identifier associated with the user equipment. The method includes transmitting, via a second network, information indicative of the assignment of the device connection identifier to a network operator, such that data communication to the device from the network operator is based at least in part on the device connection identifier.

In another innovative aspect, an apparatus for locally hosting a plurality of communication devices is provided. The apparatus includes a receiver configured to receive, via a first network, a message from at least one of the plurality of communication devices, the message including information identifying the communication device connected with the apparatus. The apparatus includes an assignment circuit configured to assign a device connection identifier to the communication device, the device connection identifier including at least a portion of a user equipment identifier associated with the apparatus. The apparatus includes a transmitter configured to transmit, via a second network, information indicative of the assignment of the device connection identifier to a network operator, such that data communication to the communication device from the network operator is based at least in part on the device connection identifier.

In another innovative aspect, an apparatus for locally hosting a plurality of communication devices is provided. The apparatus includes means for receiving, via a first network, a message from at least one of the plurality of communication devices, the message including information identifying the communication device connected with the apparatus. The apparatus includes means for assigning a device connection identifier to the communication device, the device connection identifier including at least a portion of a user equipment identifier associated with the apparatus. The apparatus includes means for transmitting, via a second network, information indicative of the assignment of the device connection identifier to a network operator, such that data communication to the communication device from the network operator is based at least in part on the device connection identifier.

In another innovative aspect, a computer-readable storage medium comprising instructions executable by a processor of an apparatus for locally hosting a plurality of communication devices is provided. The instructions cause the apparatus to receive a message from at least one of the plurality of communication devices, the message including information identifying the communication device connected with the apparatus. The instructions cause the apparatus to assign a device connection identifier to the communication device, the device connection identifier including at least a portion of a user equipment identifier associated with the apparatus. The instructions cause the apparatus to transmit, via a second network, information indicative of the assignment of the device connection identifier to a network operator, such that data communication to the communication device from the network operator is based at least in part on the device connection identifier.

In a further innovative aspect, a method of binding a plurality of devices to a user equipment is provided. The method includes transmitting, via a first network from the user equipment to a network operator, registration information including an identifier for at least one of the plurality of devices connected with the user equipment via a second network. The method includes receiving a device connection identifier for the device from the network operator via the first network, the device connection identifier including at least a portion of a user equipment identifier associated with the user equipment, the device connection identifier indicating a connection between the device and the user equipment on the second network. The method includes receiving a data communication from the network operator based at least in part on the device connection identifier.

In yet another innovative aspect, an apparatus for locally hosting a plurality of wireless devices is provided. The apparatus includes a transmitter configured to transmit from the apparatus to a network operator via a first network registration information including an identifier for at least one of the plurality of wireless devices. The wireless device is connected with the apparatus via a second network. The apparatus includes a receiver configured to receive a device connection identifier for the device from the network operator, the device connection identifier including at least a portion of a user equipment identifier associated with the apparatus. The device connection identifier indicates a connection between the communication device and the apparatus via the second network. The receiver is further configured to receive a data communication from the network operator based at least in part on the device connection identifier.

In a further innovative aspect, an apparatus for locally hosting a plurality of wireless devices is provided. The apparatus includes means for transmitting from the apparatus to a network operator via a first network registration information including an identifier for at least one of the plurality of wireless devices connected with the apparatus via a second network. The apparatus further includes means for receiving a device connection identifier for the device from the network operator, the device connection identifier including at least a portion of a user equipment identifier associated with the apparatus. The device connection identifier indicates a connection between the wireless device and the apparatus on the second network. The apparatus also includes means for receiving, via the first network, a data communication from the network operator based at least in part on the device connection identifier.

In another innovative aspect, a computer-readable storage medium comprising instructions executable by a processor of an apparatus for locally hosting a plurality of communication devices is provided. The instructions cause the apparatus to transmit from the apparatus to a network operator via a first network registration information including an identifier for at least one of the plurality of communication devices, the communication device connected with the apparatus via a second network. The instructions cause the apparatus to receive a device connection identifier for the communication device from the network operator, the device connection identifier including at least a portion of a user equipment identifier associated with the apparatus. The device connection identifier indicates a connection between the communication device and the apparatus via the second network. The instructions cause the apparatus to receive, via the first network, a data communication from the network operator based at least in part on the device connection identifier.

In yet another innovative aspect, a method of binding a device to a user equipment is provided. The method includes transmitting, via a first network, a message from the device to the user equipment, the message including information identifying the device connected with the user equipment via the first network. The method includes receiving, via the first network, a device connection identifier from the user equipment at the device, the device connection identifier including at least a portion of a user equipment identifier associated with the user equipment. The method includes receiving a data communication from the user equipment via the first network based at least in part on the device connection identifier, the data communication received by the user equipment via a second network.

In a further innovative aspect, an apparatus for binding a user equipment is provided. The apparatus includes a transmitter configured to transmit a message to the user equipment via a first network, the message including information identifying the apparatus connected with the user equipment. The apparatus includes a receiver configured to receive a device connection identifier from the user equipment, the device connection identifier including at least a portion of a user equipment identifier associated with the user equipment. The receiver is further configured to receive a data communication from the user equipment based at least in part on the device connection identifier. The data communication is received by the user equipment via a second network.

In one innovative aspect, another apparatus for binding to a user equipment is provided. The apparatus includes means for transmitting a message from the device to the user equipment via a first network, the message including information identifying the apparatus connected with the user equipment. The apparatus includes means for receiving a device connection identifier from the user equipment at the apparatus via the first network. The device connection identifier includes at least a portion of a user equipment identifier associated with the user equipment. The apparatus includes means for receiving a data communication from the user equipment via the first network based at least in part on the device connection identifier, the data communication received by the user equipment via a second network.

A computer-readable storage medium comprising instructions executable by a processor of an apparatus for binding to a user equipment is provided in a further innovative aspect. The instructions cause the apparatus to transmit a message from the device to the user equipment via a first network, the message including information identifying the apparatus connected with the user equipment. The instructions cause the apparatus to receive a device connection identifier from the user equipment at the apparatus via the first network. The device connection identifier includes at least a portion of a user equipment identifier associated with the user equipment. The instructions cause the apparatus to receive a data communication from the user equipment based at least in part on the device connection identifier, the data communication received by the user equipment via a second network.

In another innovative aspect, a method of triggering a device connected to a user equipment is provided. The method includes receiving, at an operator network, a device triggering request including an identifier associated with the device to be triggered. The device is connected to the user equipment via a first network. The method includes identifying the user equipment hosting the device based at least in part on the identifier. The method includes initiating a communication link in a second network to the user equipment, the communication link based at least in part on information identifying the device to be triggered. The method includes transmitting, via the second network, the device triggering request to the user equipment.

An apparatus for triggering a device connected to a user equipment is provided in another innovative aspect. The apparatus includes a receiver configured to receive, at an operator network, a device triggering request including an identifier associated with the device to be triggered. The device is connected to the user equipment via a first network. The apparatus also includes a processor. The processor is configured to identify the user equipment hosting the device based at least in part on the identifier. The processor is further configured to initiate a communication link in a second network to the user equipment, the communication link based at least in part on information identifying the device to be triggered. The apparatus also includes a transmitter configured to transmit via the second network the device triggering request to the user equipment.

Another apparatus for triggering a device connected to a user equipment is provided in a further innovative aspect. The apparatus includes means for receiving, at an operator network, a device triggering request including an identifier associated with the device to be triggered. The device is connected to the user equipment via a first network. The apparatus includes means for identifying the user equipment hosting the device based at least in part on the identifier. The apparatus includes means for initiating a communication link in a second network to the user equipment, the communication link based at least in part on information identifying the device to be triggered. The apparatus includes means for transmitting via the second network the device triggering request to the user equipment.

Another computer-readable storage medium comprising instructions executable by a processor of an apparatus for triggering a device connected to a user equipment is provided in a further innovative aspect. The instructions cause the apparatus to receive at an operator network a device triggering request including an identifier associated with the device to be triggered. The device is connected to the user equipment via a first network. The instructions cause the apparatus to identify a the user equipment hosting the device based at least in part on the identifier. The instructions cause the apparatus to initiate a communication link in a second network to the user equipment, the communication link based at least in part on information identifying the device to be triggered. The instructions cause the apparatus to transmit via the second network the device triggering request to the user equipment.

In another innovative aspect, a method of communication to a device hosted by a user equipment is provided. The method includes storing, at the user equipment, information relating a network identifier for the device to a service identifier for the device. The method includes receiving, at the user equipment from a network operator via a first network, routing information and the network identifier. The method includes receiving, at the user equipment from a network operator via the first network, a message including the service identifier, the message targeted for the device. The method includes obtaining the routing information and the network identifier based at least in part on the service identifier. The method includes transmitting via a second network at least a portion of the message to the device, the transmitting based at least in part on the obtained routing information.

An apparatus for communicating with a device locally hosted by the apparatus is provided in yet another innovative aspect. The apparatus includes a memory storing information relating a network identifier for the device to a service identifier for the device. The apparatus includes a receiver configured to receive, from a network operator via a first network, routing information and the network identifier. The receiver is further configured to receive a message via the first network including the service identifier, the message targeted for the device. The apparatus includes a processor configured to obtain the routing information and the network identifier based at least in part on the service identifier. The apparatus includes a transmitter configured to transmit via a second network at least a portion of the message to the device, the transmitting based at least in part on the obtained routing information.

An apparatus for communicating with a device locally hosted by the apparatus is provided in a further innovative aspect. The apparatus includes means for storing information relating a network identifier for the device to a service identifier for the device. The apparatus includes means for receiving, from a network operator via a first network, routing information and the network identifier. The apparatus includes means for receiving, via the first network, a message including the service identifier, the message targeted for the device. The apparatus includes means for obtaining the routing information and the network identifier based at least in part on the service identifier. The apparatus includes means for transmitting, via a second network, at least a portion of the message to the device, the transmitting based at least in part on the obtained routing information.

A computer-readable storage medium comprising instructions executable by a processor of an apparatus for communicating with a device locally hosted by the apparatus. The instructions cause the apparatus to store information relating a network identifier for the device to a service identifier for the device. The instructions cause the apparatus to receive, from a network operator via a first network, routing information and the network identifier. The instructions cause the apparatus to receive a message including the service identifier via the first network, the message targeted for the device. The instructions cause the apparatus to obtain the routing information and the network identifier based at least in part on the service identifier. The instructions cause the apparatus to transmit, via a second network, at least a portion of the message to the device, the transmitting based at least in part on the obtained routing information.

BRIEF DESCRIPTION OF THE DRAWINGS

FIG. 5 shows a process flow diagram of an exemplary process for binding a plurality of devices to a user equipment.

FIG. 6 shows a functional block diagram of another exemplary device that may be employed within the communication system of FIG. 1.

FIG. 7 shows a process flow diagram of another exemplary process for binding a plurality of devices to a user equipment.

FIG. 8 shows a functional block diagram of another exemplary device that may be employed within the communication system of FIG. 1.

FIG. 11 shows a process flow diagram of an exemplary process for triggering a device hosted by a local host/user equipment.

FIG. 12 shows a functional block diagram of another exemplary device that may be employed within the communication system of FIG. 1.

FIG. 13 shows a process flow diagram of an exemplary process of communication to a device through a local host/user equipment.

FIG. 14 shows a functional block diagram of another exemplary device that may be employed within the communication system of FIG. 1.

DETAILED DESCRIPTION

Figure 1:
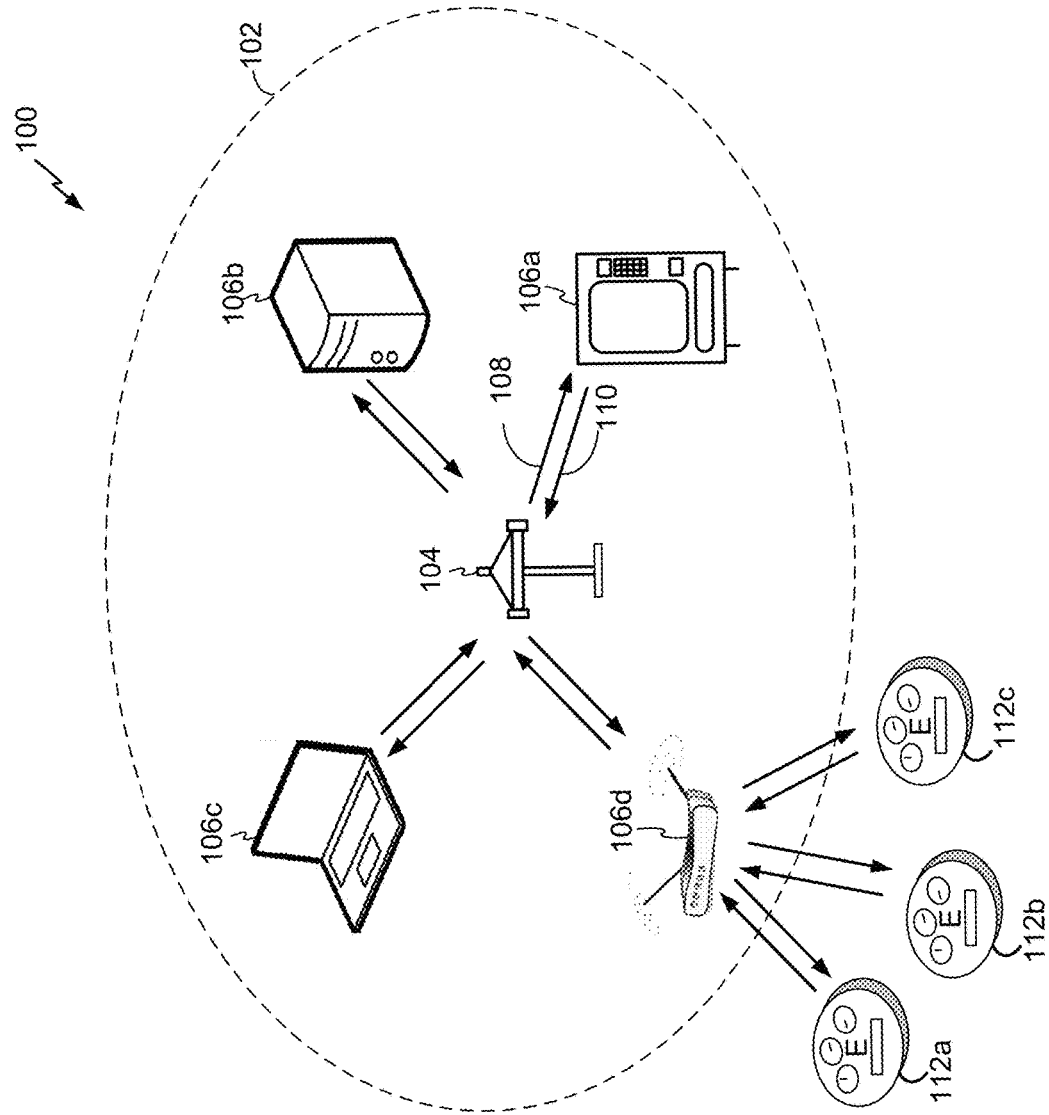
FIG. 1 shows an exemplary communication system.

Various aspects of the novel apparatuses and methods are described more fully hereinafter with reference to the accompanying drawings. The teachings disclosure may, however, be implemented in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel apparatuses and methods disclosed herein, whether implemented independently of or combined with any other aspect of the disclosure. For example, an apparatus may be implemented or a method may be practiced using any number of the aspects set forth herein. In addition, the scope of the description is intended to cover such an apparatus or method which is practiced using other structure, functionality, or structure and functionality in addition to or other than the various aspects set forth herein. Any aspect disclosed herein may be implemented by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different communication technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to a communication standard, such as wireless protocols. For example, the various aspects described herein may use Zigbee, WiFi, HomePlug, Bluetooth, Zwave, cellular, or other radio communications.

In some implementations, a communication network includes various devices which are the components that access the network. For example, there may be two types of devices: access points ("APs") and clients (also referred to as stations, or "STAs"). In general, an AP serves as a hub or base station for the communication network and a STA serves as a user of the communication network. For example, a STA may be a laptop computer, a personal digital assistant (PDA), a mobile phone, etc. In an example, a STA connects to an AP via a WiFi (e.g., IEEE 802.11 protocol such as 802.11ah) compliant wireless link to obtain general connectivity to the Internet or to other wide area networks.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Router, Transceiver, Hub, or some other terminology.

A station "STA" may also comprise, be implemented as, or be known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a telephone, a Session Initiation Protocol ("SIP") phone, a wireless local loop ("WLL") station, a personal digital assistant ("PDA"), a handheld device, or some other suitable processing device connected to a modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, an appliance, power generating/transmitting equipment, surveillance equipment (e.g., seismograph, smoke detector, Geiger counter, camera), smartmeter, vending machine or any other suitable device that is configured to communicate via a wireless or wired medium in a machine to machine fashion.

Some devices may be used for smart metering, in a smart grid network, or in smart appliances (e.g., appliances configurable in response to transmitted or detected signals). Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

Prior to communicating with a network, a STA generally registers with a network. Registration may be done at power up, based on zones, based on time (e.g., periodic), or parameter based. For example, in a cdma2000 1× system, a periodic registration system is used to ensure the STA may be reached. In some implementations, an AP transmits (e.g., broadcasts) a registration period. If a STA has no traffic channel established, or other types of registration (e.g., signaling) during the registration period, the STA is configured to transmit a registration at least one time during the registration period to maintain presence on the network. This form of registration may also be included in EVDO, UMTS, LTE, HRPD, and PPP systems.

In some implementations, a first STA may provide a service to another STA. For example, a website may be considered a service providing STA wherein the server hosting the website may be the service providing STA. A smartphone accessing the website may be considered the other STA. The smartphone and the website STAs may communicate through one or more APs. The AP connected with the smartphone identifies the smartphone and any communications associated therewith. The identification may be accomplished through a registration protocol. Similar procedure may be used to connect server hosting the website. By this example, the network of APs may be considered under the purview of a network operator. The network operator may control the devices identified to it for example by shaping the network traffic (e.g., latency, priority, bandwidth) or blocking certain traffic (e.g., packet level, source, destination, port, etc.).

As discussed above, networked technologies and network capable devices are becoming more pervasive. In some instances, a device may access a network provided by a network provider through a user equipment such as a cable modem or mobile hot-spot. In this situation, the cable modem or mobile hot-spot may be configured to identify itself to the network operator to gain access to network services. However, once connected, various devices coupled with the cable modem or mobile hot-spot may use the network services. In some implementations, the user equipment may be referred to as a "gateway."

One non-limiting advantage of the systems and methods described herein is to allow a network operator the ability to identify and control these devices accessing an operator's network through devices such as a mobile hot-spot. By identifying not only the user equipment attached to the network (e.g., mobile hot-spot), but also the devices attached to the user equipment, traffic may be more finely controlled. For example, in the machine to machine (M2M) context, it may be desirable to allow a M2M capable fire detector higher priority than, say, a M2M data collection device (e.g., thermometer). The identification also allows the network operator to adjust subscription levels for various devices.

Another non-limiting advantage of the systems and methods described here is to allow the network operator to locate the device connected to user equipment (UE). In the mobility context, the user equipment may operate on a cellular network. The user equipment may be mobile. In the case where a service provider wishes to send a signal (e.g., a trigger) to a device attached to the user equipment, the network may be configured to identify the location of the UE as well as the device.

A further non-limiting advantage of the systems and methods described is allowing multiple locally hosted devices to share a user equipment connection for data communication. The sharing may be implemented as parallel connection sharing whereby each hosted device may obtain a unique connection to the user equipment which can be used independent of other device connections for forward or reverse link communication. For example, if the user equipment is configured for multiple-input and multiple-output communications, the user equipment may receive and/or transmit data for two or more hosted devices at or near the same point in time. The reception and/or transmission need not be deferred while waiting for another device to complete communications.

FIG. 1 shows an exemplary communication system. The communication system 100 may operate pursuant to a wireless standard. The communication system 100 may include an AP 104, which communicates with STAs such as a computer 106c, a service provider server 106b, a machine to machine device 106a such as a vending machine, and a local access point (a.k.a. local host or gateway) 106d (individually or collectively hereinafter identified by 106). Each STA 106 may be configured to include an identifier. For example, the local access point 106d may include a user equipment identifier. The user equipment identifier may be used to identify a local access point 106d. In some implementations the user equipment identifier may uniquely identify the local access point 106d. In some implementations, the user equipment identifier may be used in conjunction with other information (e.g., network operator) to uniquely identify the local access point 106d. A user equipment identifier may include an international mobility equipment identity or international mobility subscriber identity.

The local access point 106d may be further configured to communicate with one or more machine to machine devices 112a, 112b, and 112c (collectively or individually hereinafter identified by 112) such as a smart utility meter or a smartmeter. In some implementations, a machine to machine device 112 may be associated with a machine to machine service provider (e.g., utility company). Each machine to machine device 112 may be configured to include a device identifier. The device identifier may be used to identify a machine to machine device 112. In some implementations the device identifier may uniquely identify the machine to machine device 112. In some implementations, the device identifier may be used in conjunction with other information (e.g., network operator, machine to machine service provider) to uniquely identify the machine to machine device 112. It will be appreciated that while the local access point 106d is described and shown as connected to machine to machine devices 112, other wireless communication devices may be configured to communicate with the network via the local access point 106d. Examples of such wireless communications devices include an IP phone, a network enabled media player, and a network enabled appliance (e.g., washer, dryer, air conditioner, over, microwave, slow cooker).

A variety of processes and methods may be used for transmissions in the communication system 100 between the AP 104 and the STAs 106. For example, signals may be sent and received between the AP 104 and the STAs 106 in accordance with OFDM/OFDMA techniques. If this is the case, the communication system 100 may be referred to as an OFDM/OFDMA system. Alternatively, signals may be sent and received between the AP 104 and the STAs 106 in accordance with CDMA techniques. If this is the case, the communication system 100 may be referred to as a CDMA system. In some implementations, the signals between the AP 104 and the STAs 106 may be sent via a wired connections such as Ethernet, optical, cable, telephone, power line, and facsimile connections.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may provide communication coverage in a basic service area (BSA) 102. The AP 104 along with the STAs 106 associated with the AP 104 and that are configured to use the AP 104 for communication may be referred to as a basic service set (BSS). The communication system 100 may not have a central AP 104, but rather may function as a peer-to-peer network between the STAs 106. Accordingly, the functions of the AP 104 described herein may alternatively be performed by a STA 106. For example, in some implementations, one or more STAs 106 may be located outside the BSA 102.

In the system 100 shown in FIG. 1, unlike machine to machine device 106*a*, the machine to machine devices 112*a*, 112*b*, and 112*c* may not be capable of initiating communication with the AP 104. Similarly, the AP 104 may not be able to identify which devices are locally connected to the local access point 106*d*. For example, the AP 104 may receive a communication from the service provider server 106*b*, such as a demand response signal. This communication may be targeted to a specific smartmeter 112*a*. Accordingly, in some implementations it may be desirable to register the specific smartmeter 112*a* such that the AP 104 may identify the specific smartmeter 112*a*. This registration process will be described in further detail below.

In another example, the machine to machine device 112*a* may be an automotive monitoring device included in an automobile. This type of machine to machine device 112*a* may be configured to communicate via a cellular device in the automobile. However, the machine to machine device 112*a* may not be located in the same BSA 102 between data transmissions. In this example, one way to communicate with the machine to machine device 112*a*, is to first locate the cellular device. Accordingly, in some implementations it may be desirable to configure the AP 104 to locate the specific machine to machine device 112*a* in a mobility setting. This may allow a service provider server 106*b* to trigger the device 112*a*. For example, an automotive manufacturer may be the service provider. By this example, the service provider server 106*b* may be configured to retrieve diagnostic information from the automotive monitoring device for further processing (e.g., generating maintenance reminders, troubleshooting, quality assurance, etc.).

The communication between the local access point 106*d* and the machine to machine devices 112 may be a local communication protocol. The communication may comprise a wired link between the machine to machine devices 112 and the local access point 106*d* (e.g., Ethernet, power line, telephone cable, coaxial cable). The communication may comprise a wireless link such as Peanut, Zigbee, WiFi, Bluetooth and the like. Multiple communication methods may be used to communicate with the various machine to machine devices 112. Furthermore, it will be appreciated that while in FIG. 1 all the machine to machine devices 112 are shown as smartmeters, machine to machine devices of type may be connected through the same local access point 106*d* (e.g., smartmeter, smoke alarm, vending machine, etc.).

Figure 2:
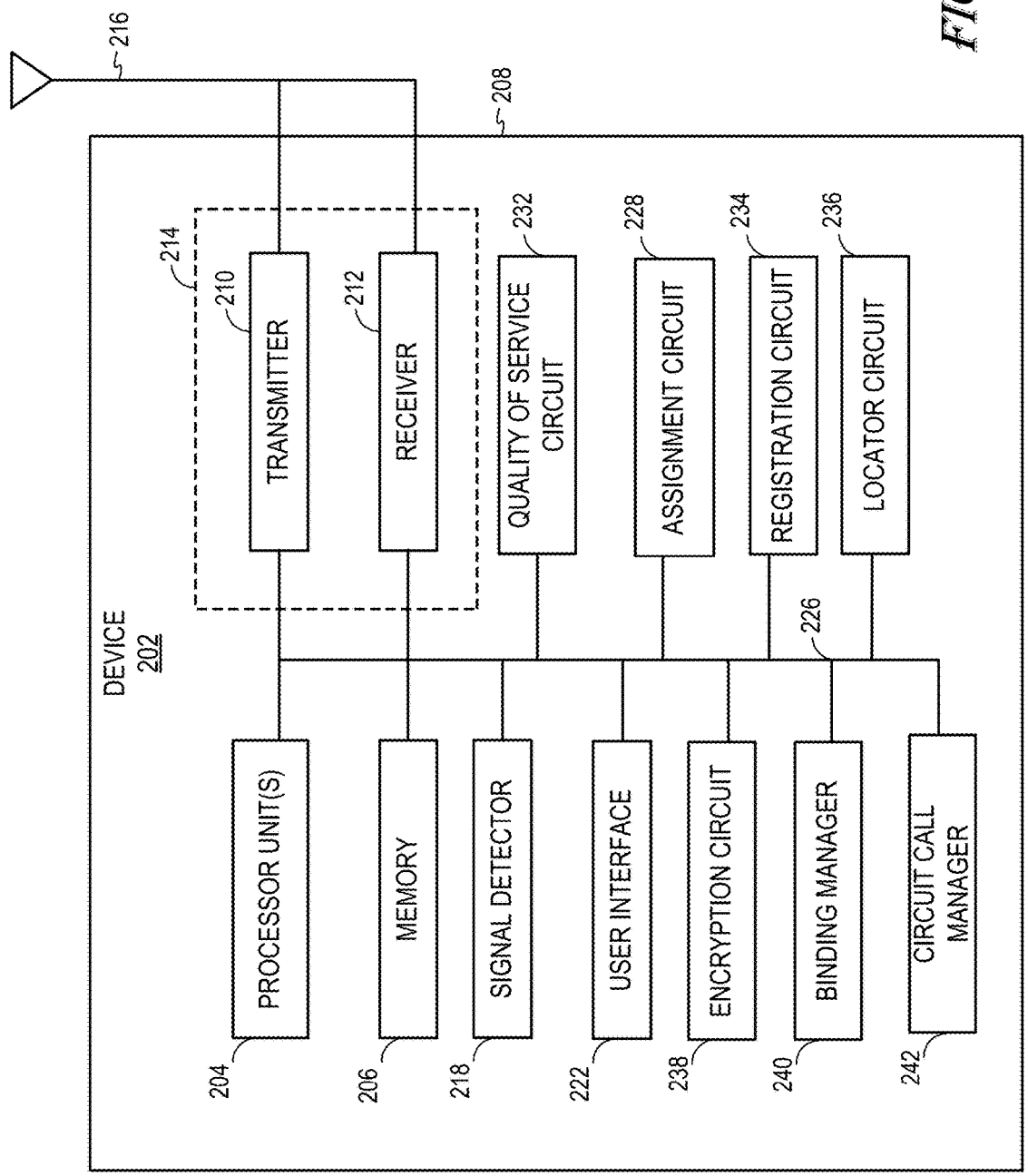
FIG. 2 shows a functional block diagram of an exemplary device that may be employed within the communication system of FIG. 1.

FIG. 2 shows a functional block diagram of an exemplary a device that may be employed within the communication system of FIG. 1. The device 202 is an example of a device that may be configured to implement the various methods described herein. For example, the device 202 may comprise the AP 104, one of the STAs 106, or a machine to machine device 112.

The device 202 may include processor unit(s) 204 which control operation of the device 202. One or more of the processor unit(s) 204 may be collectively referred to as a central processing unit (CPU). Memory 206, which may include both read-only memory (ROM) and random access memory (RAM), provides instructions and data to the processor units 204. A portion of the memory 206 may also include non-volatile random access memory (NVRAM). The processor unit(s) 204 may be configured to perform logical and arithmetic operations based on program instructions stored within the memory 206. The instructions in the memory 206 may be executable to implement the methods described herein.

When the device 202 is implemented or used as a transmitting node, the processor unit(s) 204 may be configured to select one of a plurality of packet formats, and to generate a packet having that format. For example, the processor unit(s) 204 may be configured to generate data packets. When the device 202 is implemented or used as a receiving node, the processor unit(s) 204 may be configured to process received packets. The processor unit(s) 204 generate a packet for transmission to one or more STAs 106 or machine to machine devices 112. A packet comprises a series of data bits representing the data being exchanged between an AP 104 and a STA 106/machine to machine device 112.

The processor unit(s) 204 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. In an implementation where the processor unit(s) 204 comprise a DSP, the DSP may be configured to generate a packet for transmission. In some aspects, the packet may comprise a physical layer data unit (PLDU).

The device 202 may also include machine-readable media for storing software. The processor unit(s) 204 may comprise one or more machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processor unit(s) 204, cause the device 202 to perform the various functions described herein.

The device 202 may include a transmitter 210 and/or a receiver 212 to allow transmission and reception, respectively, of data between the device 202 and a remote location. The transmitter 210 and receiver 212 may be combined into a transceiver 214. An antenna 216 may be electrically coupled with the transceiver 214. The device 202 may also include (not shown) multiple transmitters, multiple receivers, multiple transceivers, and/or multiple antennas.

The transmitter 210 may be configured to wirelessly transmit packets and/or signals. For example, the transmitter 210 may be configured to transmit different types of packets generated by the processor unit(s) 204, discussed above. The packets are made available to the transmitter 210. For example, the processor unit(s) 204 may store a packet in the memory 206 and the transmitter 210 may be configured to retrieve the packet. Once the transmitter 210 retrieves the packet, the transmitter 210 transmits the packet to the device 202 via the antenna 216.

The antenna 216 on the device 202 may detect the transmitted packets/signals. The receiver 212 may be configured to process the detected packets/signals and make them available to the processor unit(s) 204. For example, the receiver 212 may store the packet in memory 206 and the processor unit(s) 204 may be configured to retrieve the packet.

The device 202 may also include a signal detector 218 that may be used in to detect and quantify the level of signals received by the transceiver 214. The signal detector 218 may detect such signals as total energy, energy per subcarrier per symbol, power spectral density, and other signals.

In some aspects, the device 202 may further comprise a user interface 222. The user interface 222 may comprise a keypad, a microphone, a speaker, and/or a display. The user interface 222 may include any element or component that conveys information to a user of the device 202 and/or receives input from the user. The device 202 may also include a housing 208 surrounding one or more of the components included in the device 202.

The device 202 may also include an assignment circuit 228. For example, the assignment circuit 228 may be included in a device 202 implemented as a local access point 106. The assignment circuit 228 may be configured to assign a device connection identifier to each of the device identifiers, the device connection identifier including at least a portion of a user equipment identifier associated with the local access point 106. For example, when the device 202 is configured to communicate via Ethernet with a machine to machine device 112, the assignment circuit 228 may receive a signal indicating a connection with the machine to machine device 112. The device connection identifier may be a composite identifier (e.g., a device identifier (e.g., IID, MAC-ID) and a connection identifier (e.g., port)). The assignment circuit 228 may maintain a list of communication bindings with the AP 104 (e.g., in memory 206). The assignment circuit 228 may then identify an unused communication binding from the maintained list to be configured for the machine to machine device 112. The assignment circuit 228 may then configure a communication pathway between the Ethernet connection and the unused communication binding. This communication pathway may then be associated with the machine to machine device 112 using the device identifier. The device 202 may refer to the entire binding through the use of a device connection identifier.

The assignment circuit 228 may provide the device connection identifier to the AP 104. For example, the assignment circuit 228 may store the device connection identifier in the memory 206. The transmitter 210 may obtain the device connection identifier and transmit this to the AP 104. In some implementations, the transmitter 210 may be configured to identify data packets transmitted from the machine to machine device 112 an incorporate the device connection identifier on the packets transmitted from the machine to machine device 116 through the device 202. Accordingly, the AP 104 can identify that a particular packet not only was transmitted by a particular STA, but also that a particular packet was transmitted by a particular device connected to the STA.

The device 202 may also include a quality of service circuit 232. A quality of service circuit 232 may be included in a STA 106, AP 104, or machine to machine device 112. A local access point 106d may include a quality of service circuit 232 configured to perform two levels of quality of service, that is to maintain quality of service between each connected machine to machine device 112 as well as maintain quality of service with the AP 104.

The quality of service circuit 232 may be configured to maintain various operational attributes that affect the quality of the services provided or received. The transmitter 210 and/or receiver may be configured to communicate with the quality of service circuit 232 to control how data is transmitted or received. For example, quality of service circuit 232 may be configured to identify a maximum bandwidth for a particular communication flow. The quality of service information may be stored in the memory 206. The quality of service information may be received from a device providing the service such as a service provider server 106b. In some implementation, the quality of service circuit 232 may be configured to derive the quality of service information for example based on a device class of the machine to machine device 112. For instance, a device that is in a low priority class such as data reporting device may be assigned lower quality of service during busy periods. Conversely, a device that is in a high priority class such as a smoke detector may be assigned a higher quality of service to ensure an alarm is raised in a timely fashion. In further implementations, the quality of service circuit 232 may be configured to negotiate quality of service with another device (e.g., machine to machine device 112 negotiating with a local access point 106d, STA 106 negotiating with an AP 104).

In some implementations, the quality of service may be specified using a tuple. The quality of service tuple may include the device connection identifier. In some implementations, an RSVP tuple may be used to specify the quality of service information.

The device 202 may also include a registration circuit 234. The registration circuit 234 may be configured to allow the device 202 to access services. For example, when the device 202 is configured as a local access point 106d, the local access point 106d may provide its user equipment identifier to the AP 104 as part of establishing a communication link therewith. In some implementations, the user equipment identifier may be used by the AP 104 to identify machine to machine device bindings for the device. For example, when deploying a smartmeter system, it may be known, a priori, how many meters 112 will be attached to a given local access point 106d. Accordingly, in this implementation, the local access point 106d may provide its identifier to the AP 104 and the AP 104 may determine the appropriate communication binding for the device. For example, the AP 104 may query a data storage maintained by a service provider to determine the number of meter attached to the identified address. In other implementations, the AP 104 may be configured to provide a pre-determined number of bindings per local access point 106d. In this implementation, the AP 104 may consult a subscription registry of user equipment identifiers and provide the pre-determined number of bindings based on a subscription for local access point 106d. Similar techniques may also be used to provide quality of service information to the quality of service circuit 232. An accounting circuit (not shown) may also be included to generate accounting information based on the device connection identifier, device class, network usage (e.g., time, quantity, type), and the like. The accounting information may then be used to control subsequent access such as according to a subscription and/or provide billing information based on the accounting information for the device.

The device may further include a locator circuit 236. For example when deploying the device 202 as an AP 104, the locator circuit 236 may be configured to identify a location for a local host/user equipment. The location may be identified based at least in part on one or more of the user equipment identifier and a device identifier for a machine to machine device 112 attached to the local host/user equipment. For example, in the mobility example discussed above, it may be desirable to trigger the machine to machine device 112. However, if the machine to machine device 112 is mobile, the location of the STA 106 associated with the machine to machine device 112 may change. The locator circuit 236 may store the location (e.g., home, mobile) of the STA 106. Using the user equipment identifier and/or the device identifier, the locator circuit 236 may be configured to identify the location of the STA 106 (e.g., query).

The device may also include an encryption circuit 238. The encryption circuit 238 may be configured to protect information transmitted from the device 202. For example, the device identifier may be integrity signed by the device 202. This can prevent unauthorized machine to machine devices from "spoofing" as legitimate machine to machine devices 112. The encryption circuit 238 may include a key store to maintain a public or private encryption key, a digital certificate, a synchronization value, a random number generator, or the like. The transmitter 210 may be configured to provide data to the encryption circuit 238 prior to transmission for encryption. Once the data has been encrypted, the encryption circuit 238 may be configured to provide information about the encryption to the transmitter 210 to be transmitted to allow the receiving device to decrypt the information. The encryption circuit 238 may also be configured to decrypt information by reversing the above for a received signal.

The device may also include a binding manager 240. The binding manager 240 may be included in a device 202 when implemented as a local access point 106d or as an AP 104. The binding manager 240 may be configured to receive binding information for the plurality of devices. In some implementations, the binding manager 240 may be configured determine binding information for each of the one or more machine to machine devices 112 based at least in part on the user equipment identifier for the local access point 106d. For example, in an implementation where the AP 104 provides a pre-determined binding assignment to the local access point 106d, the binding manager 240 may be configured to process the binding assignments. In one implementation, the binding manager 240 includes a memory or is configured to communicate with the memory 206.

The device may also include a circuit call manager 242. The circuit call manager 242 may be included in a device implemented as an AP 104. For example, in an implementation where a service provider transmits a message to the AP 104 for a machine to machine device 112, the circuit call manager 242 may be configured to initiate a circuit call to the local host/user equipment. The circuit call manager 242 may include including information identifying the device to be triggered to allow proper routing of the trigger to the machine to machine device 112. In some implementations, the circuit call manager 242 may be configured to manage cdma2000 1× circuit communications such as circuit calls and short message delivery point-to-point (SMDPP) signaling.

The various components of the device 202 may be coupled together by a bus system 226. The bus system 226 may include a data bus, for example, as well as a power bus, a control signal bus, and a status signal bus in addition to the data bus. Those of skill in the art will appreciate the components of the device 202 may be coupled together or accept or provide inputs to each other using some other mechanism.

Although a number of separate components are illustrated in FIG. 2, those of skill in the art will recognize that one or more of the components may be combined or commonly implemented. For example, the processor unit(s) 204 may be used to implement not only the functionality described above with respect to the processor unit(s) 204, but also to implement the functionality described above with respect to the signal detector 218. Further, each of the components illustrated in FIG. 2 may be implemented using a plurality of separate elements.

Figure 3:
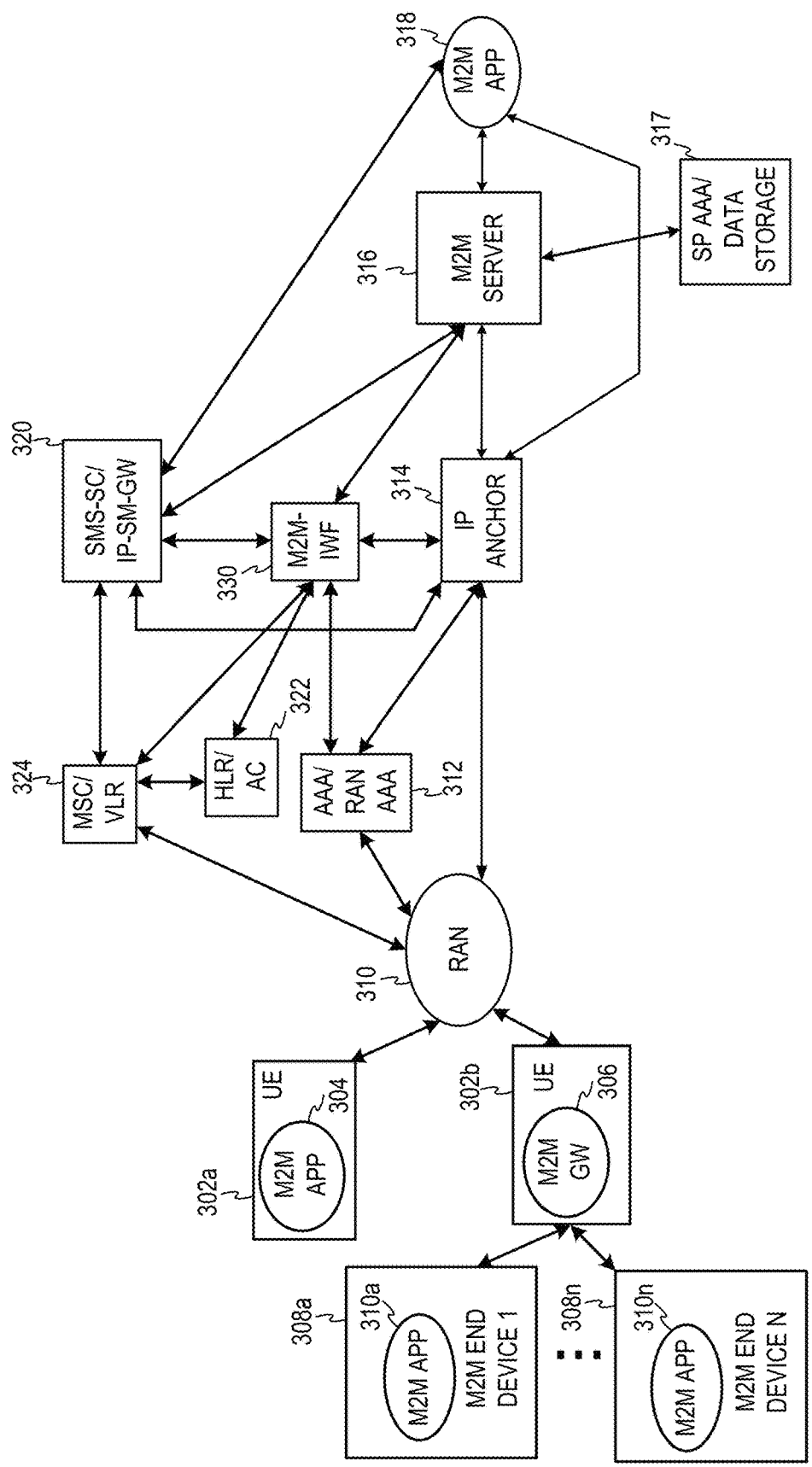
FIG. 3 shows an interaction diagram for various aspects of a communication system.

FIG. 3 shows an interaction diagram for various aspects of a communication system. The system 300 includes two user equipment (UE) devices 302a and 302b (collective or individually hereinafter identified as 302). In some implementation, the user equipment devices 302 may be implemented as local access points. The user equipment 302a includes a machine to machine client application (M2M APP) 304. This machine to machine client application 304 may be configured to communicate with a machine to machine server application 318. For example, the machine to machine client application 304 may be a data collection application configured to transmit a meter reading to the machine to machine server application 318 for further processing (e.g., safety monitoring, billing).

The user equipment 302b shown in FIG. 3 includes a machine to machine gateway (M2M GW) 306. The machine to machine gateway 306 may include one or more of the elements shown in FIG. 2 to allow machine to machine devices to connect to the user equipment 302b. In the implementation shown, machine to machine device 308a and machine to machine device 308n (collectively or individually hereinafter identified as 308) are coupled with the user equipment 302b. As discussed above, this coupling may be wired (e.g., Ethernet, power line, coaxial, fiber optic) or wireless (e.g., Zigbee, WLAN, Bluetooth). Machine to machine device 308a and machine to machine device 308n include machine to machine client application 310a and machine to machine client application 310n, respectively. Although not shown, a machine to machine device 308 may include more than one machine to machine client application.

When the machine to machine device 308 connects with the user equipment 302b, the machine to machine device 308 may transmit registration information to attach to the user equipment 302b. The registration information may include one or more of a device class and a device identifier associated with the machine to machine device 308. For example, the device identifier may include a media access control (MAC) identifier, or a service provider unique identifier.

The user equipment 302 may be configured to couple with a radio access network (RAN) 310. The radio access network 310 may implement LTE, cdma2000, 1x, or other radio access technology. As part of the coupling, the user equipment 302 may be configured to transmit a user equipment identifier to the RAN 310 which may be used to route traffic to the user equipment 302.

The user equipment 302b may be further configured to assign a device connection identifier to each machine to machine device 308 connected with the user equipment 302b. In some implementations, the assignment may be performed at the machine to machine application level. The machine to machine gateway 306 may use this assignment information to send data to and receive data from the machine to machine device 308. For example, the machine to machine gateway 306 may ensure the packets include the device connection information prior to transmission to the RAN 310. On the receiving end, when a packet is received from the RAN 310, a portion of the packet (e.g., header field) may be interrogated to obtain the device connection identifier associated with the packet. The machine to machine gateway 306 may then use this device identifier to route the packet to the appropriate machine to machine device 308.

In some implementations, the RAN 310 is coupled with an IP anchor 314. The IP anchor 314 may include one or more of a packet gateway (P-GW), a packet data serving node (PDSN), a home agent (HA), or a location mobility anchor (LMA). The IP anchor 314 may be configured to provide a bridge between the radio domain and the packet data domain. As such, the IP anchor 314 may perform data communication with a machine to machine (M2M) server 316. The data communication received by machine to machine server 316 may ultimately be serviced by a machine to machine application 318. In some implementations, the machine to machine server 316 and the machine to machine server application 318 are controlled by a machine to machine service provider, such as a utility company or automotive manufacturer as described above. In some implementations, the IP anchor 314 may be configured to communicate directly with the machine to machine server application 318.

In some implementations, such as that shown in FIG. 3, it may be desirable for a service provider to also include a service provider (SP) authentication, authorization, and accounting (AAA) module 317. This module may be implemented as a data storage configured to store usage information for the machine to machine server 316 and/or the machine to machine server application 318. For example, as a data packet passes through the machine to machine server, the machine to machine server 316 may identify the device connection information associated with the packet. This may allow the machine to machine server 316 to identify the machine to machine device 308 that generated the packet. Based on one or more of authentication, authorization, subscription, and the like, the machine to machine server 316 may process the packet. For example, if the machine to machine device 308 is subscribed for one transaction per week and a second transaction is received, the machine to machine server 316 may block the packet. In this case, the machine to machine server 316 may be configured to transmit a response packet identifying the cause (e.g., subscription exceeded) and/or how to correct the issue (e.g., increasing the subscription level).

In some implementations, it may be desired to communicate with the machine to machine device 308 via a non-packet switched network. For example, the machine to machine server 316 may transmit information to the machine to machine device using control plane signaling. In one example, the machine to machine server 316 may be configured to communicate with a machine to machine interworking framework (M2M-IWF) 330. The machine to machine interworking framework 330 may receive a control plane signal from the machine to machine server 316. In one implementation, the machine to machine interworking framework 330 may be coupled with the IP anchor 314. In this implementation, the M2M-IWF 330 may transmit the control signal to the IP anchor 314 for delivery as described above. In some implementations, the M2M-IWF 330 may be further configured to translate the control plane signal into a packet signal for transmission to the IP anchor 314.

In some implementations, the M2M server 316 or the M2M server application 318 may transmit data to a machine to machine device 308 via SMS messaging. The message may be received by an SMS service controller (SMS-SC)/IP short-message gateway (IP-SM-GW) 320. In this implementation, the SMS-SC/IP-SM-GW 320 may be configured to receive the message and transmit the message to the IP anchor 314. In one implementation, the SMS-SC/IP-SM-GW 320 may communicate with the M2M-IWF 330 to determine the PSDN associated with the intended message recipient. The SMS-SC/IP-SM-GW 320 may then establish a connection with the identified IP anchor and transmit the SMS as an IP SMS packet. The IP SMS packet may include one or more of the device identifier, device connection identifier, and the user equipment identifier associated with the machine to machine device 308 to receive the SMS message.

While the above communication paths have been described as communications originating with the machine to machine server 316 or the machine to machine server application 318 and destine for a machine to machine device 308 or a machine to machine client application executed thereon, it will be understood that similar transmission patterns may be implemented to allow the machine to machine device 308 to transmit communication to the machine to machine server 316 or the machine to machine server application 318.

In some implementations, the M2M server 316 and/or the M2M server application 318 may push a message to a M2M device 308. For example, if a utility company is the service provider, during high electricity demand periods, the utility company may transmit a demand response signal to smartmeters (M2M device 308) indicating a reduced usage situation has arisen. The smartmeters may be configured, for example, to reduce the usage by disabling certain non-essential appliances. In this case, the location of the M2M device 308 may not necessarily be known.

When a UE 302*b* first registers with the RAN 310, the RAN 310 may transmit a record of the location of the UE 302*b* to a mobility switching center (MSC)/visitor location record 324. In some implementations, the RAN 310 may provide the user equipment identifier for the UE 302*b*. In some implementation, the RAN 310 may also provide the device connection identifier for the attached devices 308. In some implementation, the RAN 310 may also provide the device identifier for the attached devices 308. A corresponding record may be transmitted to a home locator record (HLR)/authentication center (AC) 324. As part of the registration, the RAN 310 may communicate with an authentication, authorization and accounting (AAA)/home subscriber server (HSS)/home location register (HLR) 312 (hereinafter referred to as "AAA 312") to identify whether the device may attach to the network, what service level it may be provided, etc. In the context of packet data networks, when the UE 302*b* registers with the RAN 310, an IP address may be associated with the UE 302*b* and/or the devices attached with the UE 302*b*.

After registration of the UE 302*b*, the M2M server 316 may transmit a message for a M2M device 308*n* attached to the UE 302*b* through one or more communication pathways. In the packet data context, user plane device triggering may be used to provide a message from a machine to machine service provider to a machine to machine device. In this implementation, the M2M server 316 may transmit the triggering request to the M2M-IWF 330. The triggering request may include an external interface identifier such as the device identifier and/or device connection identifier. The M2M-IWF 330 may determine the IP address for the device associated with the external interface identifier. For example, the M2M-IWF 330 may query one or both of the network operator AAA 312 or service provider AAA 317 to identify the appropriate device connection identifier to use for transmitting the triggering request. As with AAA 312, the service provider AAA 317 may be implemented as one or more of an authentication, authorization and accounting (AAA) server, a home subscriber server (HSS), and a home location register (HLR). In the context of packet data connections, the IP address may be used to create a data flow through the IP anchor 314 or the appropriate IP anchor for the IP address. This in turn may cause the RAN 310 attached to the UE 302*b* to create a data flow for the device trigger. Once established, the data flow may be used for bi-directional packet data communication between the device to be triggered and the M2M server 316.

Another communication pathway that may be used to trigger a device may include 1× circuit short message delivery point-to-point (SMDPP) triggering. As above, the UE 302*b* is registered with the network operator. In this case, the M2M-IWF 330 may query the network operator AAA 312 to obtain an internal identifier for the network operator for the device to be triggered. The internal identifier may be a composite identifier generated based on a mobile station identifier (MS_ID) or an international mobile subscriber identify (IMSI) for the UE 302*b* and the device connection identifier for the M2M device 308*a*. Once the internal identifier is obtained, the M2M-IWF 330 may be configured to query the home location record (HLR)/authentication center (AC) 324 to identify where the UE 302*b* as well as the device 308*n* is located. For example, the M2M-IWF 330 may send an SMSREQ message to the HLR/AC 325. Once the location is identified, a circuit call SMDPP may be initiated to the mobility MSC/VLR 324 for the UE 302*b* that the device 308*n* is currently attached. For example, the M2M-IWF 330 may be configured to transmit a SMDPP signal which includes the device trigger and a communication. By this example, the M2M-IWF 330 may be configured to transmit the trigger request along with a new service indicator (SRVIND). The MSC/VLR 324 may transmit an application data delivery service (ADDS) message to the RAN 310 which the UE 302*b* is attached. The ADDS message may include the device trigger such as a page message and a service option identifier. In some implementations, the service option identifier may be indicative that the paging signal is a machine to machine device trigger page. The ADDS message, in turn, may cause a paging signal to be transmitted from the RAN 310 to the local access point 302*b*. In some implementations, the paging signal may include the service option identifier. One or more of the transmitted messages may be implemented using data burst messaging. In some implementations, an existing data burst message type may be used for machine to machine device triggering. In some implementations, a new data burst message type may be defined for use in machine to machine device triggering.

Yet another communication pathway that may be used to trigger a machine to machine device is cdma2000 1× special call identifier triggering. In some implementations, it may be possible to trigger the device 308*n* through the HRPD without IP/PPP. The UE 302*b* first registers its user equipment identifier with the network operator such that the M2M-IWF 330 may identify the location of the UE 302*b*. The M2M-IWF 330 receives a trigger message from the M2M server 316. The M2M-IWF 330 may be configured to trigger a voice call with the UE 302*b*. The RAN 310, in turn, may forward the trigger to the UE 302*b* such as via paging. The UE 302*b* may transmit a paging response to the RAN 310. The RAN 310 may then transmit an acknowledgment of the trigger to the M2M-IWF 330 that may, in turn, forward the acknowledgement to the M2M server 316. Once a channel is established between the UE 302*b* and the network, the MSC/VLR 324 may transmit a per-determined calling identifier to the UE 302*b* indicating the trigger is a machine to machine trigger. The UE 302*b* may be configured to receive the calling identifier and end the call without answering the call. In still another implementation, it may be possible to deliver the M2M trigger using data burst message using the traffic channel setup for voice call. In lieu of answering the call, the UE 302*b* may then establish data link with the IP anchor 314 through the RAN 310 to the M2M server 316 either through HRPD or through IS2000 1×. Accordingly, the packet data link is established between the UE 302*b*, and thus any locally attached M2M device 308, and the M2M server 316. This packet data link may be used to communicate directly with the M2M device 308 as described above.

Still another communication pathway that may be used to trigger a machine to machine device is cdma2000 1× circuit call with a machine to machine service option. This communication pathway is substantially similar to the cdma2000 1× special call identifier triggering described above. However, instead of avoiding the answering of the call, in this pathway, the call is setup between the UE 302*b* and the network (e.g., the MSC/VLR 324 via the RAN 310). Once the call is established, the data may be transmitted via the circuit call from the M2M-IWF 330 to the UE 302*b*. The UE 302*b* may then be configured to pass the trigger to the device 308 to be triggered. In some implementations, the M2M-IWF 330 may host a circuit switched application. The hosted circuit switched application hosted by the M2M-IWF 330 may act as a peer to a corresponding circuit switched application configured at the UE 302*b*. As such, the M2M-IWF 330 and the UE 302*b* (and thus the M2M device 308 connected thereto) may communication using circuit switch call signaling. In some implementations the communication may be performed over a dedicated channel.

One or more of the RAN 310, the IP anchor 314, and the M2M-IWF 330 may be configured to communicate with an AAA/RAN AAA 312. In some implementations the AAA/RAN AAA 312 may be provided by the network operator. The AAA/RAN AAA 312 may include authentication, authorization, and accounting information. This information may be used to control communications on the operator's network. In some implementations, the information may be stored in a data storage coupled with the AAA/RAN AAA 312. The information may be associated with a one or more of a device class, a device connection identifier, a device identifier, a user equipment identifier, or any combination of these. The information may identify types of packets that are allowed for an identified device or device class. The information may also be used to generate accounting information (e.g., billing information based on network resource usage quantity, type, and/or time) for a device, local host/user equipment, or service provider.

Although a number of separate components are illustrated in FIG. 3, those of skill in the art will recognize that one or more of the components may be combined or commonly implemented. Further, each of the components illustrated in FIG. 3 may be implemented using a plurality of separate elements.

Figure 4:
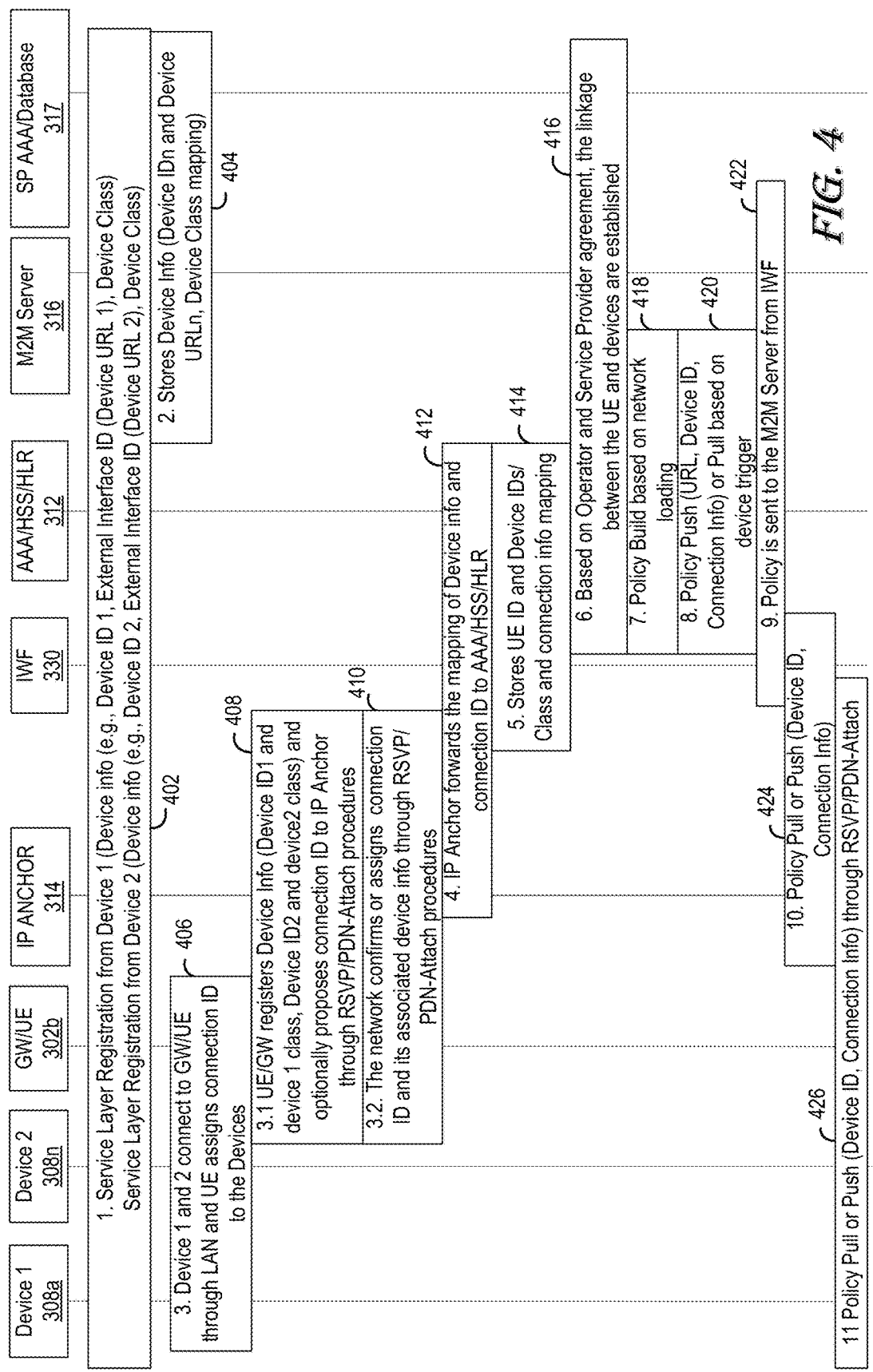
FIG. 4 shows a call flow diagram for an exemplary device binding.

FIG. 4 shows a call flow diagram for an exemplary device binding. The call flow begins with the M2M device 308*a* provides a service layer registration 402. The service layer registration may include information about the M2M device 308*a* such as the device identifier, the device URL, external interface identifier, the device class, and user equipment identifier. As shown in FIG. 4, service layer registration 402 may include information about multiple M2M devices. Each service layer registration 402 may correspond to a device and/or an application configured to execute on an M2M device 308.

The service layer registration 402 may be predefined for each service layer. For example the registration information may be stored in memory. In some implementations, the registration information may be received using over the air provisioning, or via a data connection with the service provider. The M2M server 316 maintains a record of the M2M device 308 registration. For example, the M2M server 316 may be coupled with a service provider AAA/database to store the registration information 404. In some implementations, this information may be stored when the M2M device 308 is manufactured. In some implementations, this information may be stored when the M2M device 308 is activated.

The M2M device 308a and the M2M device 308n may then connect to the local access point 302b via call 406. The connection may be, for example, through a local area network (LAN). The local access point 302b may be configured to assign a device connection identifier to each of the M2M device 308a and the M2M device 308n as described above. In some implementations, the local access point may be configured to use network address translation (NAT). In these implementations, the device connection identifier may be an external port identifier that is used by the device 308 along with the external IP address (e.g., IP address of the local access point 302b) assigned by the IP anchor 314. As traffic passes through the local access point 302b, the local access point 302b may be configured to modify the IP information included in the traffic (e.g., IP packet header), to identify the device 308 associated with the traffic. In this way, packets flowing from the device 308 through the local access point 302b will be identifiable as from the device 308. Similarly, a packet transmitted for the device 308 may use the IP information to identify not only the local access point 302b, but also the device 308 which should receive the packet. In some implementations, the local access point 302b may be configured to use IPv6 addressing. In these implementations, the device connection identifier may be the IPv6 interface identifier that is used along with the IPv6 prefix that is assigned by IP anchor 314. Although described in the alternative, a local access point 302 may be configurable to perform both NAT and IPv6 addressing.

In some implementations IP anchor 314 may use the IP header to control the device 308. Based on the IP header alone, the IP anchor 314 may not have visibility into the application header for traffic originating from the device 308. The IP address for all the devices 308, as seen by the IP anchor 314, is the same external IP address that is assigned to the local access point 302b. However, the private IP address of each device 308 may be different behind the NAT module of the local access point 302b. Accordingly, in some implementations, it may be desirable to enable the IP anchor 314 to control each of the devices 308 behind the NAT module of the local access point 302b.

Once assigned, the local access point 302b may be configured to transmit the assignment information for the connected devices to the network through call 408. For example, the local access point may transmit to the IP anchor 314 the external port identifier that is assigned by the NAT module configured in the local access point to each of the connected devices. In another implementation, the local access point may transmit to the IP anchor 314 the interface identifier that is assigned by the IPv6 module configured in the local access point to each of the connected devices. As shown in FIG. 4, one call transmits the assignment information for M2M device 308a and M2M device 308n. In some implementations, separate calls may be made for each device/application assignment. The assignment information may be transmitted through the RAN to the IP anchor 314. Various protocols may be used to transmit the assignment information such as RSVP, packet data network attach procedures, access network discovery and selection functions, and control plane signaling. If RSVP is used, one or more fields may be added to the 5-tuple that is sent in the RSVP to include the assignment information. For example, a RSVP 5-tuple may include: source IP address, destination IP address, source port number, destination port number, and protocol number. An additional field may be included to include the device connection identifier. The additional field may also include the device identifier. Alternatively, yet another separate field may be included to specify the device identifier. In some implementations, the assignment information may also be transmitted through the RAN to the mobility switching center. The assignment information may also be transmitted to the network operator AAA 312.

The assignment information transmitted may be a suggested assignment. The network operator may further process the assignment suggested by the local access point 302b. If the network operator determines the assignment is appropriate the network may transmit a confirmation of the assignment to the local access point 402b at call 410. If the network determines the assignment is inappropriate, the network may transmit an alternate assignment to the local access point 402b at call 410. The determination of the appropriateness of a suggested assignment may be based on one or more of the device identifier, the device class, the local access point, the service provider for the device, network conditions, and the like.

In some implementations, the local access point 302b may not transmit the assignment information. In some implementations it may be desirable to allow the network operator to assign the connection identifier for the connected devices. In this implementation, the local access point 302b may transmit the device identifier to the network (e.g., IP anchor 314). The network operator may then transmit the assignment information to the local access point 302b via call 410. For example, the assignment information may be transmitted via RSVP. In some implementations, control plane signaling may be used to transmit the assignment information. Once agreed upon, the assignment information may be forwarded from the IP anchor 314 to the network operator AAA 312 at call 412. The network operator AAA 312 may be configured to store the assignment information (e.g., device identifier, device connection identifier, user equipment identifier) at call 414. For example, the network operator AAA 312 may include a data storage configured to maintain a mapping between the connection information and the devices encompassing the connection.

In some implementations, the assignment information may be used the AAA 312 of the network operator as well as the service provider AAA 317 to determine control for the identified M2M device. For example, the network operator AAA 312 may only include subscription information for the local access point 302. In this example, the service provider AAA 317 will communicate with the service provider AAA 317 to refine the control for the M2M device 308a. In some implementations, the network operator AAA 312 may include both the information associated with the local access point 302 and the M2M device 308a. In some implementations, the network operator AAA 312 may derive the control information for the M2M device 308a based at least in part on the assignment information. For example, the network operator AAA 312 may transmit a query generated based on information from the assignment information to the service provider AAA 317. In this example, the service provider AAA 317 may respond with appropriate control information for the identified M2M device. In some implementations, the control information may be based at least in part on an agreement between the network operator and the service provider.

Once the control information has been obtained, at call 416 the preconfigured communication link or online communication link may be built for the local access point 302b. At 418, a policy is determined for the local access point and/or M2M device. The policy may be determined based at least in part on the network load, local access point information, M2M device information, service provider, etc. In some implementations, the policy may be provided to the IP anchor 314 via the M2M-IWF 330. In these implementations, the policy may be transmitted to the M2M-IWF 330 at call 420. The policy may be transmitted as a push message from the network operator AAA 312 to the M2M-IWF 330. In some implementations, the M2M-IWF 330 may be configured to pull the policy information from the network operator AAA 312 such as via a query. At call 420, the policy may be transmitted from the M2M-IWF 330 to the IP anchor 314. At call 422, the policy information may be sent to the M2M server 316 from the M2M-IFW 330. The network operator AAA 312 may include one or more of the URL, device identifier, or device connection identifier in the policy information. The policy information may be transmitted based on the M2M device 308 involved in the communication. When transmitting the policy information from the M2M-IWF 330 to the IP anchor 314 (e.g., call 422), the policy information may include one or more of the device identifier and the device connection information.

A similar push or pull mechanism as described above may be used to provide the policy to the IP anchor 314. In some implementations, it may be desirable to configure the IP anchor 314 to directly receive the policy information from the network operator AAA 312. For example, at call 424, the IP anchor 314 may be configured to pull the policy information from the network operator AAA 312. The network operator AAA 312 may be configured to push the policy information to the IP anchor 314.

At call 426, the policy information may be provided to the local access point 302b and M2M device 308 via push or pull as described above. In some implementations, the policy information provided to the local access point 302b includes the device identifier and the device connection identifier for the device involved in the communication path. In some implementations, the policy information transmitted at call 426 may be transmitted through RSVP or packet data signaling.

Once the M2M device 308a has been bound, forward link control may be exercised for the M2M device 308a. For example, the M2M IWF 330 may be configured to provide the policy to the M2M-server on a per M2M device identified using M2M connection identifier to block or delay certain device classes. The M2M-IWF 330 may be configured to query the AAA 312 or SP AAA 317 for device identity and device connection info to block or delay certain devices or device classes that connected to the local access point 302b. The device connection info and associated policy may be sent to IP anchor 314 (e.g., the IP anchor) or the MSC/SMS center (e.g., the data anchor). Accordingly, the IP anchor or data anchor may be configured to enforce the policy for the corresponding connection for the M2M device 308a. The IP anchor will use the external device identifier embedded in the address of the packets targeted for M2M device to enforce the policy. For example, the port number used by the NAT module configured at the local access point, that is embedded in the IP header to control the M2M device.

Once the M2M device 308a has been bound, reverse link control may also be exercised for traffic of the M2M device 308a. The network operator may provide the policy to the local access point 302b to block or delay certain devices or device classes that connected to the local access point 302b. The RAN may be configured to send this policy information through overhead messages. The network may be configured to transmit the policy information through an access network discovery and selection function (ANDSF), PPP, or RSVP. The local access point 302b may then enforce the policy for the corresponding device connection identifier. Packets may be dropped by the network (e.g., IP anchor) based on the device connection identifier of the device (IID/Port number) generating the traffic. As described above, the device connection identifier may be included in the transmitted traffic (e.g., in a header field).

FIG. 5 shows a process flow diagram of an exemplary process for binding a plurality of devices to a user equipment. The method may be performed by one or more of the devices described herein, such as, for example, the device 202 shown in FIG. 2 or the device shown below in FIG. 6. In some implementations, the process may be implemented in/by a local access point 106d.

The process shown in FIG. 5 may generally be described as an assignment process. The user equipment may be configured to assign connection information for each device connected to (e.g., locally hosted by) the user equipment. The local hosting may be via a first network such as a local area network (e.g., Bluetooth, Zigbee, WiFi, Z-wave, etc.). The assigned information may then be transmitted to the network operator via a second network (e.g., wide area or local area network) providing service to the user equipment. When a network entity receives a communication for the device, the assigned information may be used to identify not just the user equipment, but also the device to receive the communication.

At block 502, a message is received via a first network from at least one of the plurality of devices. The message includes information identifying each device connected with the user equipment. In some implementations, receiving the method includes receiving the message via a local network connection. The message may include a device class for each device. A device class generally provides information about the associated device such as data rate, intended usage pattern (e.g., data, voice, hybrid), capability for the device (e.g., radio access technology), and the like. As discussed above, the information identifying each device may include a media access control (MAC) identifier, an international mobility equipment identity, or an international mobility subscriber identity.

At block 504, a device connection identifier is assigned to the device. The device connection identifier includes at least a portion of the user equipment identifier associated with the user equipment. In some implementations, assigning the device connection identifier includes assigning an interface identity identifier to the device. The assignment of the device connection identifier may include assigning a port number to the device connection identifier. The assignment may include storing the connection identifier in a memory along with the associated information identifying the device.

At block 506, information indicative of the assignment of the device connection identifier are transmitted to a network operator via a second network. In some implementations, information indicative of the identified device may also be transmitted. This information may be used to allow data communication to the device from the network operator based at least in part on the device connection identifier. In some implementations, the network operator may provide this information to a M2M service provider, such as a utility company or electronic-media provider. An example data communication is a packet data communication where the packet data communication includes the device connection identifier for the device. In some implementations, the packet data communication may include a control signal (e.g., trigger) for the device. In some implementations, the transmission of block 506 may follow one or more of RSVP, PPP, or other packet data network attach procedures.

FIG. 6 shows a functional block diagram of another exemplary device that may be employed within the communication system of FIG. 1. The device 600 may be implemented as a local host/user equipment configured to locally host a plurality of communication devices. A local hosting device may have more components than the simplified device 600 shown in FIG. 6. The communication device 600 shown includes only those components useful for describing some prominent features of certain implementations. The device 600 includes a receiving circuit 602, an assigning circuit 604, and a transmitting circuit 606.

In some implementations the receiving circuit 602 is configured to receive a message from at least one of a plurality of communication devices via a first network (e.g., local area network), the message including information identifying the communication device connected with the device 600. The receiving circuit 602 may include one or more of an antenna, a receiver, and a processor. In some implementations, means for receiving include the receiving circuit 602.

The assigning circuit 604 may be configured to assign a device connection identifier to the communication device, the device connection identifier including at least a portion of a user equipment identifier associated with the device 600. The assigning circuit 604 may include one or more of a processor, a network interface, and a memory. In some implementations, means for assigning may include the assigning circuit 704.

The transmitting circuit 606 may be configured to transmit, via a second network (e.g., local area network and/or wide area network) information indicative of the assignment of the device connection identifier to a network operator, such that data communication to the communication device from the network operator is based at least in part on the device connection identifier. The transmitting circuit 606 may include one or more of a processor, an antenna, a transmitter, and a memory. In some implementations, means for transmitting include the transmitting circuit 606.

FIG. 7 shows a process flow diagram of another exemplary process for binding a plurality of devices to a user equipment. The method may be performed by one or more of the devices described herein, such as, for example, the device 202 shown in FIG. 2 or the device shown below in FIG. 8. In some implementations, the process may be implemented in/by a local access point 106*d*.

The process shown in FIG. 7 may generally be described as a look-up process. The user equipment transmits information associated with an attached device to a network operator via a first network such as a local area network or wide area network. The network operator (or a service provider coupled therewith) then provides the connection information for the identified device to the user equipment.

At block 702 registration information including an identifier for at least one of the plurality of devices connected with the user equipment is transmitted from the user equipment to a network operator via a first network. Each device is connected to the user equipment via a second network. In some implementations, the first network includes a local or wide area network such as a cellular network. The registration information may be received from the device via the second network such as a local area network (e.g., Bluetooth, Zigbee, WiFi, Z-wave, etc.). The transmission may be a wired or wireless transmission. It may be desirable, in some implementations, to transmit a device class for the connected device. The identifier for each device may include one or more of a media access control identifier, an international mobility entity identifier, or an international mobility subscriber identity.

At block 704, a device connection identifier for each device is received from the network operator. The device connection identifier includes at least a portion of a user equipment identifier associated with the user equipment. The device connection identifier may indicate a connection between each device and the user equipment on the second network. The user equipment identifier may include one or more of a media access control identifier, an international mobility entity identifier, or an international mobility subscriber identity. The device connection identifier may include an interface identity identifier and a port for the connection. In some implementations, the device connection identifier and/or device class may be used to determine a quality of service for the device.

At block 706, a data communication is received from the network operator based at least in part on the device connection identifier. In implementations where the quality of service is also based on the device connection identifier, the data communication is further subjected to the associated quality of service. The data communication may include a packet data network communication.

FIG. 8 shows a functional block diagram of another exemplary device that may be employed within the communication system of FIG. 1. The device 800 may be implemented as a user equipment configured to locally host a plurality of communication devices. A user equipment device may have more components than the simplified device 800 shown in FIG. 8. The device 800 shown includes only those components useful for describing some prominent features of certain implementations. The device 800 includes a transmitting circuit 802, a receiving circuit 804, and a data communication circuit 806.

The transmitting circuit 802 may be configured to transmit from the device 800 to a network operator via a first network registration information including an identifier for at least one of the plurality of communication devices. The transmitting circuit 802 may include one or more of a processor, an antenna, a transmitter, and a memory. In some implementations, means for transmitting include the transmitting circuit 802.

The receiving circuit 804 may be configured to receive a device connection identifier for the communication device from the network operator, the device connection identifier including at least a portion of a user equipment identifier associated with the local host/user equipment device 800. The device connection identifier indicates a connection between the communication device and the local host/user equipment device 800 on the second network. The receiving circuit 804 may include one or more of an antenna, a receiver, and a processor. In some implementations, means for receiving include the receiving circuit 804.

The data communication circuit 806 may be configured to receive, via the first network, data communication from the network operator based at least in part on the device connection identifier. The data communication circuit 806 may include one or more of a signal processor, a receiver, an antenna, and a memory. In some implementations, means for data communication may include the data communication circuit 806.

Figure 9:
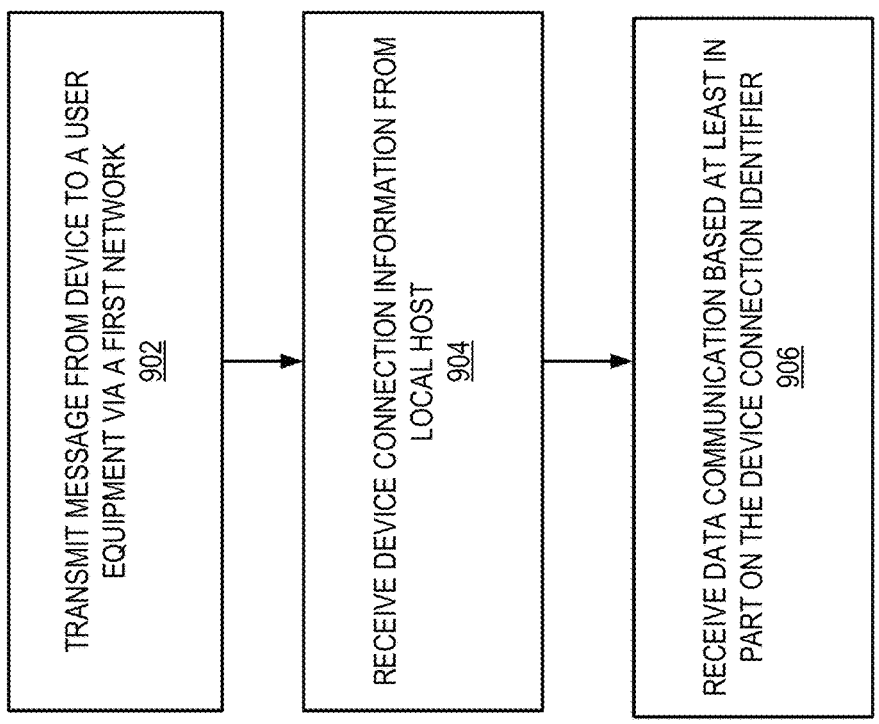
FIG. 9 shows a process flow diagram of an exemplary process of binding a device to a user equipment.

FIG. 9 shows a process flow diagram of an exemplary process of binding a device to a user equipment. The process shown in FIG. 9 may be implemented in, for example, the device 202 shown in FIG. 2 or as described below in FIG. 10. In some implementations, the process may be implemented in/by a machine to machine device 112*a* coupled with a local access point 106*d*. The process of binding for a device to a user equipment shown in FIG. 9 is applicable whether the binding is performed according to an assignment or a look-up as described above in FIGS. 5 and 7, respectively.

At block 902, a message is transmitted, via a first network such as a local area network, from the device to the user equipment. The message includes information identifying the device connected to the user equipment. The transmission may be wired or wireless transmission. In some implementations, the transmission may be via a local network connection. The message may include a device class for the identified device.

At block 904, a device connection identifier is received from the user equipment at the device via the first network. The device connection identifier includes at least a portion of the user equipment identifier associated with the user equipment. In some implementations, quality of service information for the device and/or device class may be received.

At block 906, a data communication is received from the user equipment via the first network based at least in part on the device connection identifier. The data communication is received by the user equipment via a second network. For example, the data communication may originate from a machine to machine service provider as discussed above. The data communication is received through a provider network (e.g., local and/or wide area network) at the user equipment. The user equipment then transmits the data communication to the device. The first and second networks may comprise different communication protocols, methods, radio access technologies, quality of service, etc. In some implementations, the data communication comprises a packet data communication.

Figure 10:
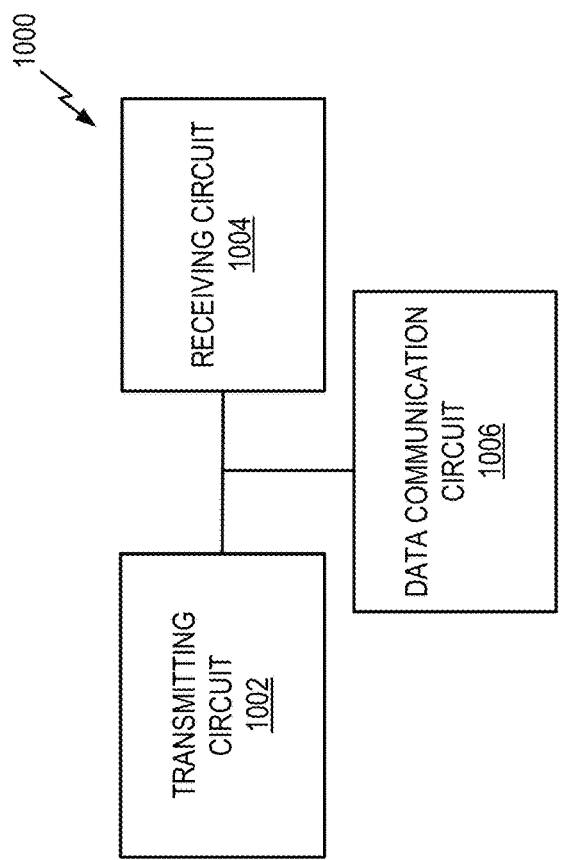
FIG. 10 shows a functional block diagram of another exemplary device that may be employed within the communication system of FIG. 1.

FIG. 10 shows a functional block diagram of another exemplary device that may be employed within the communication system of FIG. 1. The device 1000 may be implemented as a device (e.g., machine to machine device 112) for binding with a user equipment. A locally hosted device may have more components than the simplified device 1000 shown in FIG. 10. The device 1000 shown includes only those components useful for describing some prominent features of certain implementations. The device 1000 includes a transmitting circuit 1002, a receiving circuit 1004, and a data communication circuit 1006.

The transmitting circuit 1002 may be configured to transmit a message from the device 1000 to the user equipment, the message including information identifying the device 1000 connected with the user equipment via a first network (e.g., local area network). The transmitting circuit 1002 may include one or more of a processor, an antenna, a transmitter, and a memory. In some implementations, means for transmitting include the transmitting circuit 1002.

The receiving circuit 1004 may be configured to receive a device connection identifier from the user equipment at the device 1000, the device connection identifier including at least a portion of a user equipment identifier associated with the user equipment. The receiving circuit 1004 may include one or more of an antenna, a receiver, and a processor. In some implementations, means for receiving include the receiving circuit 804.

The data communication circuit 1006 may be configured to receive, via the first network, a data communication from the user equipment based at least in part on the device connection identifier. The data communication may be received by the user equipment via a second network as described above. The data communication circuit 1006 may include one or more of a signal processor, a receiver, an antenna, and a memory. In some implementations, means for data communication may include the data communication circuit 1006.

FIG. 11 shows a process flow diagram of an exemplary process for triggering a device hosted by a local host/user equipment. The process shown in FIG. 11 may be implemented, for example, using the device as described above in FIG. 2 or below in FIG. 12. In some implementations, this method may be included in an access point 104 (e.g., an IWF) as described above. At block 1102, a device triggering request is received at an operator network. The device triggering request may include a device identifier associated with the device to be triggered. The device to be triggered may be connected to the user equipment via a first network such as a local area network.

At block 1104, a user equipment hosting the device is identified based at least in part on the device identifier. In some implementations, the identification may include querying a home locator record for the local host/user equipment, the query based at least in part on the identifier associated with the device to be triggered.

At block 1106, a communication link in a second network to the local host/user equipment is initiated, the communication link based at least in part on information identifying the device to be triggered. The communication link may include a circuit call such as a cdma2000 1× circuit call. In some implementations, the initiation of the communication link is further based on a service option identifier. A service option identifier may generally refer to a value corresponding to a communication link characteristic such as forward or reverse link multiplexing, as forward or reverse link data rates, and the like.

At block 1108, the device triggering request is transmitted to the local host/user equipment via the second network. In some implementations, the transmission of the triggering request to the local host/user equipment may include receiving a request for a second communication link from the local host/user equipment and transmitting the device triggering request to the local host/user equipment via the second communication link. The second communication link may not necessarily be the same (e.g., network, radio access technology) as the communication link initiated at block 1106. In some implementations, the second communication link may include a data packet communication link. It may be desirable to receive an acknowledgment that the device was triggered, such as via a paging response.

FIG. 12 shows a functional block diagram of another exemplary device that may be employed within the communication system of FIG. 1. A communication device may have more components than the simplified wireless communication device 1200 shown in FIG. 12. The communication device 1200 shown includes only those components useful for describing some prominent features of certain implementations. The communication device 1200 includes a receiving circuit 1202, an identifying circuit 1204, a call initiating circuit 1206, and a transmitting circuit 1208.

The receiving circuit 1202 may be configured to receive, at an operator network, a device triggering request including a device identifier associated with the device to be triggered. The device to be triggered may be connected to the user equipment via a first network. The receiving circuit 1202 may include one or more of a memory, a processor, and a signal detector. In some implementations means for receiving include a receiving circuit 1202.

The identifying circuit 1204 may be configured to identify the location of a local host/user equipment for the device based at least in part on the device identifier. The identifying circuit 1204 may include one or more of a memory, a processor, and a location circuit. In some implementations, means for identifying include the identifying circuit 1204.

The call initiation circuit 1206 may be configured to initiate a communication link to the local host/user equipment in a second network, the communication link based at least in part on information identifying the device to be triggered. The call initiation circuit 1206 may include a signal detector, a memory, and a transmitter. In some implementations, means for initiating include the call initiation circuit 1206.

The transmitting circuit 1208 may be configured to transmit the device triggering request to the local host/user equipment via the second network. The transmitting circuit 1208 may include one or more of a processor, an antenna, a transmitter, and a memory. In some implementations, means for transmitting include the transmitting circuit 1208.

FIG. 13 shows a process flow diagram of a method of communication to a device hosted by a user equipment. The method shown in FIG. 13 may be implemented in/by one or more of the devices described herein, such as the device 202 shown in FIG. 2 or below in FIG. 14. In some implementations, the process may be implemented in/by a local access point 106d.

At block 1302, information relating a network identifier for the device to a service identifier for the device is stored at the user equipment. In some implementations, the network identifier may include a permanent network access identifier. The service identifier may be associated with a subscription to a service for the device.

At block 1304, routing information and the network identifier is received from a network operator via a first network. The first network may include a wide area network and/or a local area network. The routing information may include a temporary international mobile subscriber identity assigned by a local radio access network and one or more of a subnet identifier and a packet data serving node identifier. The user equipment may now have the information needed to transmit information to the device. Similarly, the local radio access network may have the information needed to route information not just to the local host/user equipment but to a specific device coupled with the local host.

At block 1306, a message including the service identifier is received via the first network. The message may be targeted for the device. The message may be received by the local host/user equipment from the network operator. The message may be generated by a service provider associated with the network operator such as a utility service provider.

At block 1308, the routing information and the network identifier are obtained based at least in part on the service identifier. For example, the information received at block 1302 and block 1304 may be stored in a memory such as a look up table. Using the service identifier in the received message, the routing information and network identifier may be determined.

At block 1310, at least a portion of the received message is transmitted, via a second network (e.g., local area network) to the device based, at least in part, on the obtained routing information. In some implementations, the message may be transformed or otherwise reformatted for transmission to the device.

FIG. 14 shows a functional block diagram of another exemplary device that may be employed within the communication system of FIG. 1. A device may have more components than the simplified device 1400 shown in FIG. 14. The device 1400 shown includes only those components useful for describing some prominent features of certain implementations. The device 1400 may be configured for communicating with a communications device connected to the device 1400. In some implementations, the device 1400 may be implemented in/as a local host or gateway. The device 1400 includes a memory 1402, a routing receiver 1404, a message receiver 1406, a message routing processor 1408, and a transmitting circuit 1410.

The memory 1402 is configured to store information relating a network identifier for the communications device to a service identifier for the communications device. The memory 1402 may include one or more of a static memory, a volatile memory, a non-volatile memory, a networked memory, a native memory, or other suitable storage medium. In some implementations, means for storing information may include the memory 1402.

The routing receiver 1404 is configured to receive, from a network operator via a first network, routing information and the network identifier. The routing receiver 1404 may include one or more of an antenna, a receiver, a signal processor, a processor, and a memory. In some implementations, means for receiving routing information and the network identifier may include the routing receiver 1404.

The message receiver 1406 is configured to receive a message, via the first network, including the service identifier, the message targeted for the communication device. The message receiver 1406 may include one or more of an antenna, a receiver, a signal processor, a processor, and a memory. In some implementations, the message receiver 1406 and the routing receiver 1404 may be commonly implemented in whole or in part. Means for receiving a message may include the message receiver 1406.

The message routing processor 1408 is configured to obtain the routing information and the network identifier based at least in part on the service identifier. The message routing processor 1408 may include one or more of a memory, a processor, a comparator, and a look up table. Means for obtaining the routing information and the network identifier may include the message routing processor.

The transmitting circuit 1410 is configured to transmit at least a portion of the message to the communications device via a second network, the transmitting based at least in part on the obtained routing information. The transmitting circuit 1410 may include one or more of an antenna, a signal generator, a transmitter, and a power source. Means for transmitting at least a portion of the message to the communication device may include the transmitting circuit 1410.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method of communication to a device hosted by a user equipment, the method comprising:

storing, at the user equipment, information based on a network identifier for the device and a service identifier for the device;

receiving, at the user equipment from a network operator via a first network, routing information and the network identifier;

receiving, at the user equipment from the network operator via the first network, a message including the service identifier;

obtaining the routing information and the network identifier based on the service identifier; and transmitting, via a second network, the message to the device, the transmitting based on the obtained routing information.

2. The method of claim 1, wherein the first network comprises at least one of a wide area network and a local area network.

3. The method of claim 1, wherein the second network comprises a local area network.

4. The method of claim 1, wherein the network identifier comprises a permanent network access identifier.

5. The method of claim 1, further comprising mapping the received network identifier to the service identifier.

6. The method of claim 1, wherein the routing information comprises a temporary international mobile subscriber identity assigned by a local radio access network and one or more of a subnet identifier and a packet data serving node identifier.

7. The method of claim 1, wherein receiving the message comprises receiving a communication from a machine-to-machine server for the device.

8. The method of claim 1, wherein the service identifier comprises a subscription identifier.

9. An apparatus for communicating with a device locally hosted by the apparatus, the apparatus comprising:

a memory storing information based on a network identifier for the device and a service identifier for the device;

a receiver configured to receive, from a network operator via a first network, routing information and the network identifier, the receiver further configured to receive a message, via the first network, including the service identifier;

a processor configured to obtain the routing information and the network identifier based on the service identifier; and a transmitter configured to transmit, via a second network, the message to the device, the transmitting based on the obtained routing information.

10. The apparatus of claim 9, wherein the first network comprises at least one of a wide area network and a local area network.

11. The apparatus of claim 9, wherein the second network comprises a local area network.

12. The apparatus of claim 9, wherein the network identifier comprises a permanent network access identifier.

* * * * *